US012627352B2

(12) United States Patent
Zhang et al.

(10) Patent No.: US 12,627,352 B2
(45) Date of Patent: May 12, 2026

(54) REFERENCE SIGNALING DESIGN AND CONFIGURATION

(71) Applicant: ZTE Corporation, Shenzhen (CN)

(72) Inventors: Shujuan Zhang, Shenzhen (CN); Bo Gao, Shenzhen (CN); Ke Yao, Shenzhen (CN); Shijia Shao, Shenzhen (CN); Wenjun Yan, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 231 days.

(21) Appl. No.: 18/532,919

(22) Filed: Dec. 7, 2023

(65) Prior Publication Data

US 2024/0154671 A1 May 9, 2024

Related U.S. Application Data

(63) Continuation of application No. PCT/CN2022/090647, filed on Apr. 29, 2022.

(51) Int. Cl.
*H04B 7/06* (2006.01)
*H04L 5/00* (2006.01)

(52) U.S. Cl.
CPC ......... *H04B 7/0626* (2013.01); *H04B 7/0634* (2013.01); *H04B 7/0639* (2013.01); *H04L 5/0051* (2013.01)

(58) Field of Classification Search
CPC .... H04B 7/024; H04B 7/0478; H04B 7/0626; H04B 7/0634; H04B 7/0639; H04B 7/066; H04B 7/0663; H04L 5/0051
(Continued)

(56) References Cited

U.S. PATENT DOCUMENTS

2017/0195100 A1 7/2017 Kim et al.
2019/0349105 A1 11/2019 Rong
(Continued)

FOREIGN PATENT DOCUMENTS

CN 107733495 A 2/2018
CN 108365877 A 8/2018
(Continued)

OTHER PUBLICATIONS

Extended European Search Report for European Patent Application 22939374.9, mailed Jan. 31, 2025 (13 pages).
International Search Report and Written Opinion for International Application No. PCT/CN2022/090647, mailed on Dec. 20, 2022 (9 pages).
(Continued)

*Primary Examiner* — Robert J Lopata
(74) *Attorney, Agent, or Firm* — Perkins Coie LLP

(57) ABSTRACT

Structures and configurations for coherent joint transmission (CJT) codebook are disclosed. In an implementation, a method of wireless communication includes determining, by a communication device, N channel status information reference signal port groups, wherein N is a positive integer, receiving, by the communication device, channel status information reference signals on the N channel status information reference signal port groups, determining, by the communication device, C precoding matrices based on the received channel status information reference signals on the N channel status information reference signal port groups, wherein C is a positive integer, and transmitting, by the communication device, a report including a precoding matrix indicator that includes information about a first type of vector, wherein the first type of vector includes C elements, and each of the C elements corresponds to one first type of frequency domain unit.

20 Claims, 6 Drawing Sheets

(58) Field of Classification Search
USPC ......................................................... 370/329
See application file for complete search history.

(56) References Cited

U.S. PATENT DOCUMENTS

| | | | |
|---|---|---|---|
| 2021/0099211 A1 | 4/2021 | Rahman et al. | |
| 2021/0105050 A1 | 4/2021 | Faxer et al. | |
| 2021/0367728 A1 | 11/2021 | Park et al. | |
| 2023/0246781 A1* | 8/2023 | Kim ........................ | H04B 7/06 |
| | | | 370/329 |
| 2023/0291450 A1* | 9/2023 | Su ........................ | H04B 7/0626 |
| 2024/0340052 A1* | 10/2024 | Grossmann ............ | H04B 7/066 |
| 2025/0226865 A1* | 7/2025 | Ahmed ................ | H04B 7/0639 |
| 2025/0260453 A1* | 8/2025 | Li ........................ | H04B 7/0404 |

FOREIGN PATENT DOCUMENTS

| | | |
|---|---|---|
| WO | 2021258401 A1 | 12/2021 |
| WO | 2022/018672 A1 | 1/2022 |

OTHER PUBLICATIONS

Huawei et al., "Discussion Summary for CSI enhancements MTRP and FR1 FDD reciprocity," 3GPP TSG RAN WG1 #102-e, e-Meeting, R1-2006973, Aug. 17-28, 2020, 35 pages.

Qualcomm Inc., "Details of CSI Measurement," 3GPP TSG RAN WG1 Meeting 90bis, R1-1718539, Prague, Czech, Oct. 9-13, 2017 (5 pages).

Lenovo, "CSI enhancements for high mobility and coherent JT," 3GPP TSG RAN WG1 #109-e, R1-2204164, e-Meeting, May 9-20, 2022 (11 pages).

Huawei et al., "CSI enhancement for coherent JT and mobility," 3GPP TSG-RAN WG1 Meeting #109-e, R1-2203151, e-Meeting, May 9-20, 2022 (18 pages).

Qualcomm Inc., "Discussion on QCL," 3GPP TSG RAN WG1 #89, R1-1708601, Hangzhou, China, May 15-19, 2017 (3 pages).

Qualcomm Inc., "Discussion on QCL," 3GPP TSG RAN WG1 NR Ad-Hoc#2, R1-1711176, Qingdao, China, Jun. 27-30, 2017 (4 pages).

* cited by examiner

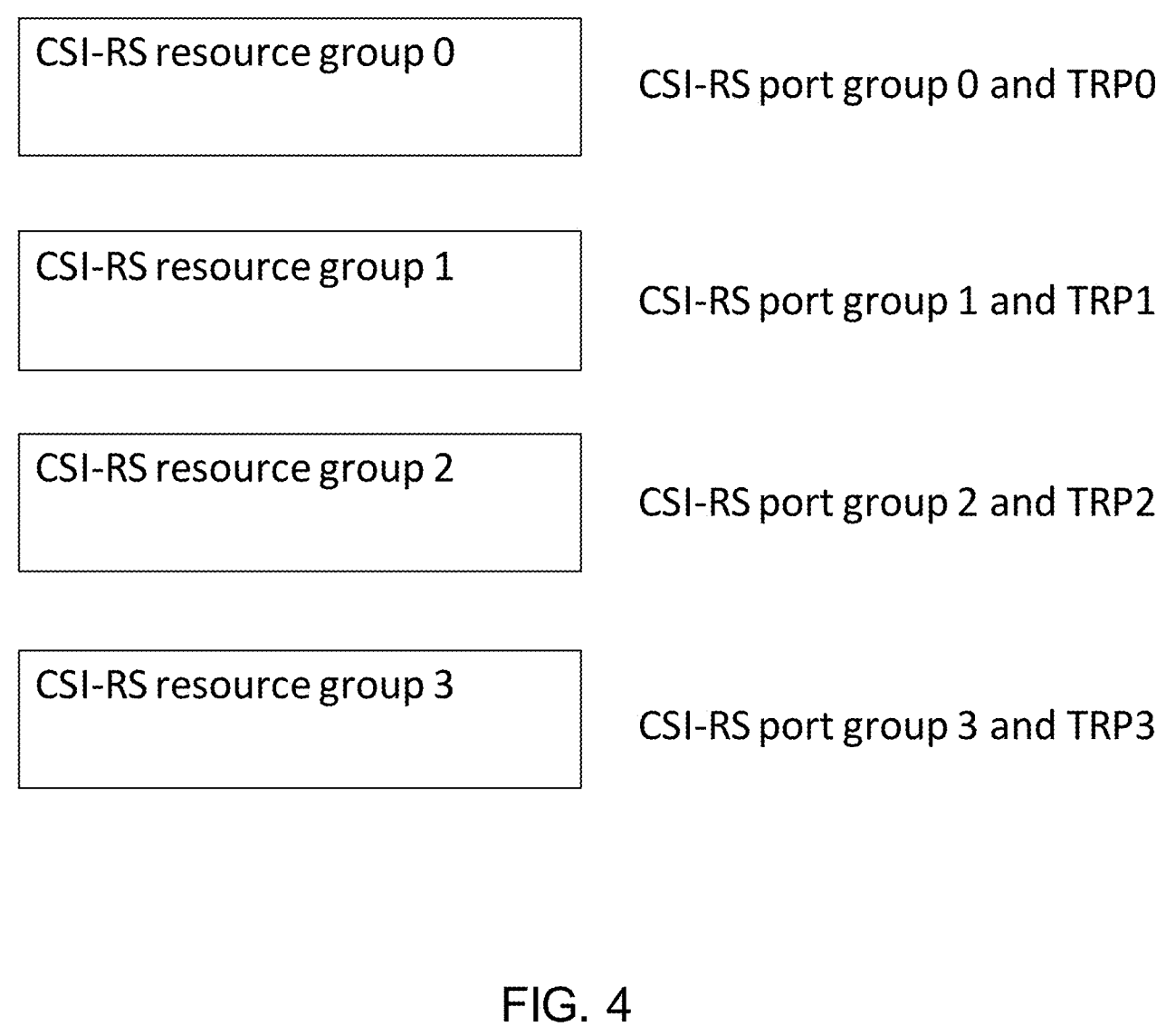

CSI-RS resource group 0 — CSI-RS port group 0 and TRP0

CSI-RS resource group 1 — CSI-RS port group 1 and TRP1

CSI-RS resource group 2 — CSI-RS port group 2 and TRP2

CSI-RS resource group 3 — CSI-RS port group 3 and TRP3

FIG. 4

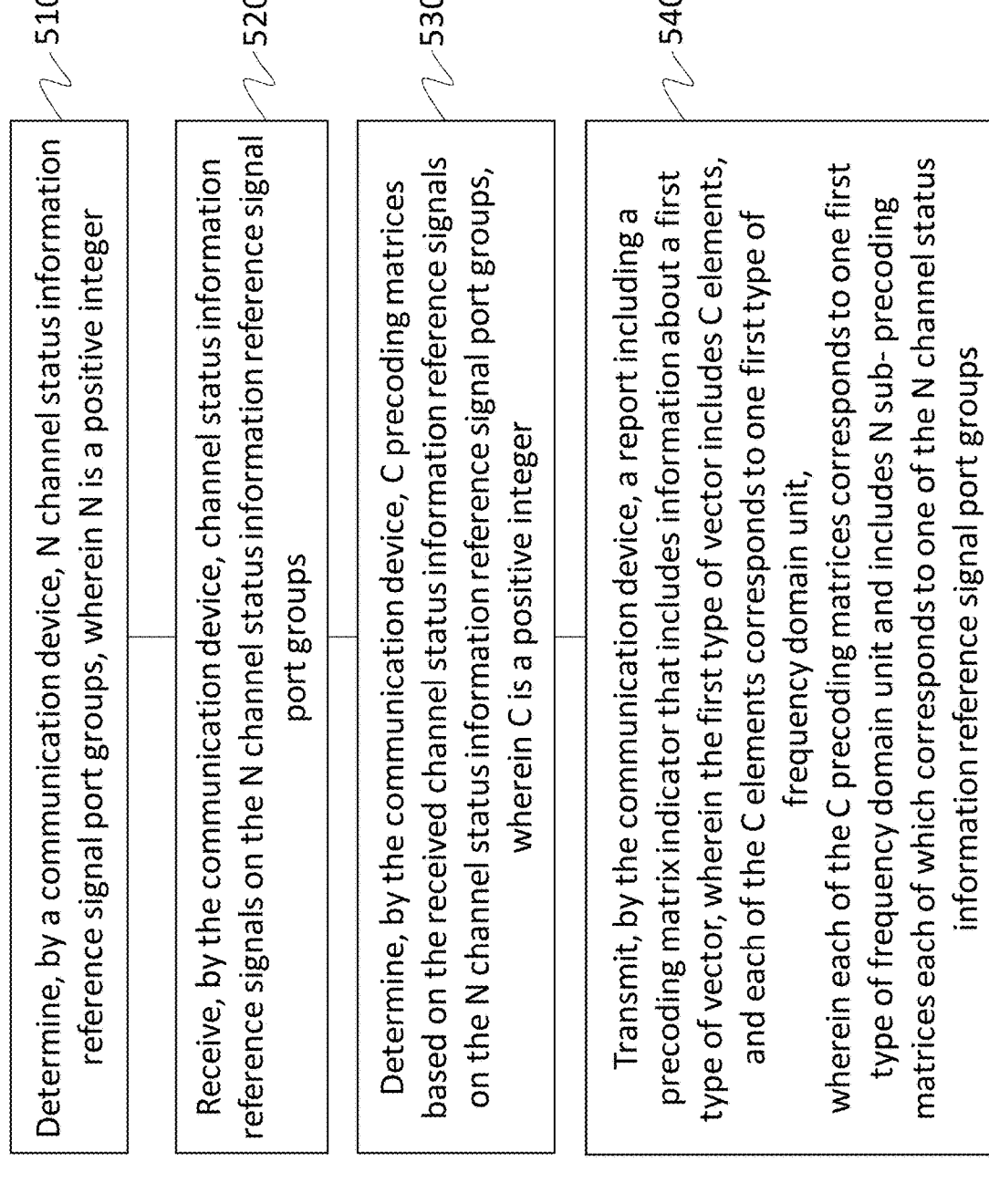

500

Determine, by a communication device, N channel status information reference signal port groups, wherein N is a positive integer ⟋510

Receive, by the communication device, channel status information reference signals on the N channel status information reference signal port groups ⟋520

Determine, by the communication device, C precoding matrices based on the received channel status information reference signals on the N channel status information reference signal port groups, wherein C is a positive integer ⟋530

Transmit, by the communication device, a report including a precoding matrix indicator that includes information about a first type of vector, wherein the first type of vector includes C elements, and each of the C elements corresponds to one first type of frequency domain unit, wherein each of the C precoding matrices corresponds to one first type of frequency domain unit and includes N sub- precoding matrices each of which corresponds to one of the N channel status information reference signal port groups ⟋540

Figure 6:
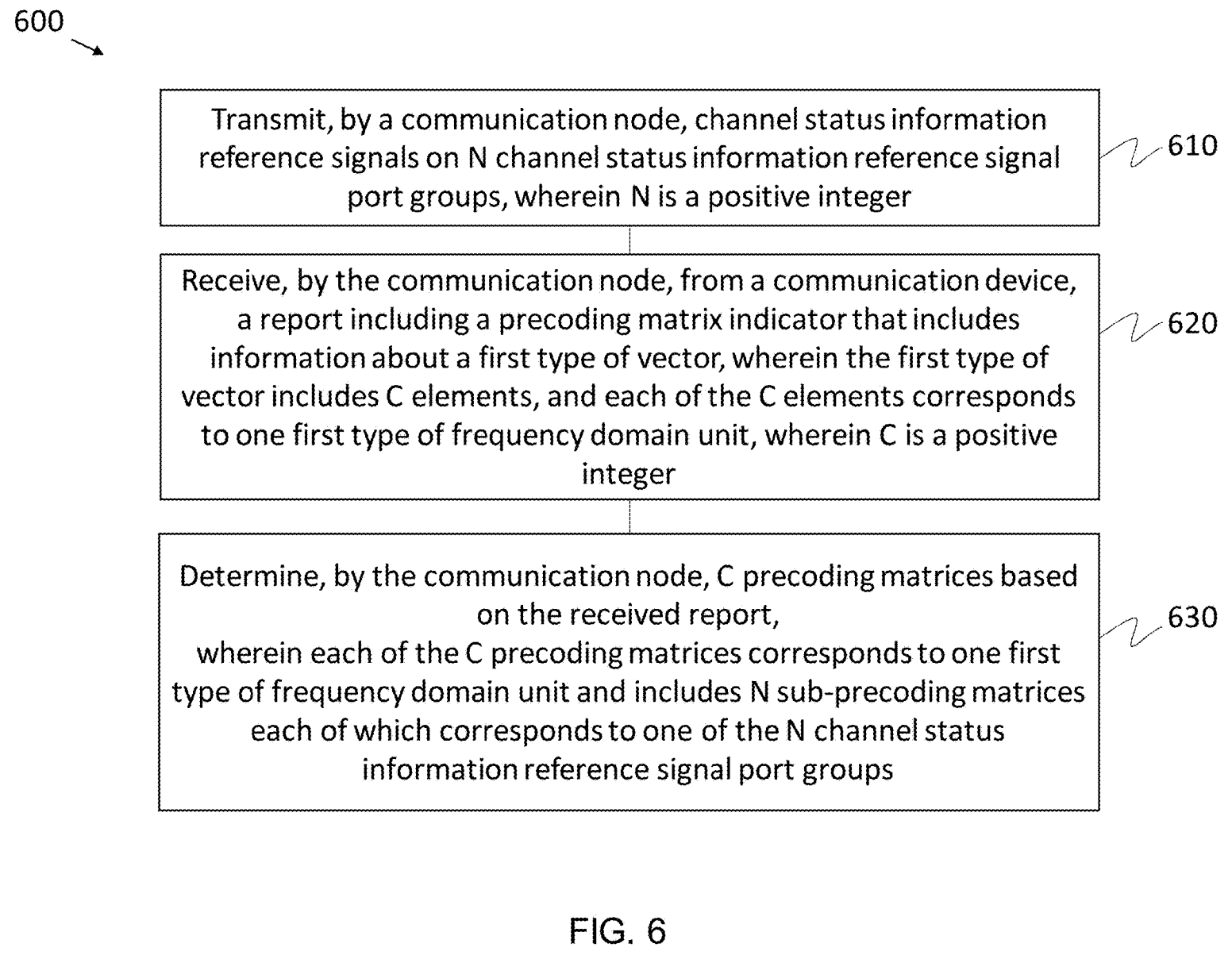

Transmit, by a communication node, channel status information reference signals on N channel status information reference signal port groups, wherein N is a positive integer

610

Receive, by the communication node, from a communication device, a report including a precoding matrix indicator that includes information about a first type of vector, wherein the first type of vector includes C elements, and each of the C elements corresponds to one first type of frequency domain unit, wherein C is a positive integer

620

Determine, by the communication node, C precoding matrices based on the received report, wherein each of the C precoding matrices corresponds to one first type of frequency domain unit and includes N sub-precoding matrices each of which corresponds to one of the N channel status information reference signal port groups

REFERENCE SIGNALING DESIGN AND CONFIGURATION

CROSS-REFERENCE TO RELATED APPLICATIONS

This application is a continuation of and claims priority to International PCT Application No. PCT/CN2022/090647, filed Apr. 29, 2022, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for structures and configurations for coherent joint transmission (CJT) codebook.

In one aspect, a method of data communication is disclosed. The method includes determining, by a communication device, N channel status information reference signal port groups, wherein N is a positive integer, receiving, by the communication device, channel status information reference signals on the N channel status information reference signal port groups, determining, by the communication device, C precoding matrices based on the received channel status information reference signals on the N channel status information reference signal port groups, wherein C is a positive integer, and transmitting, by the communication device, a report including a precoding matrix indicator that includes information about a first type of vector, wherein the first type of vector includes C elements, and each of the C elements corresponds to one first type of frequency domain unit, wherein each of the C precoding matrices corresponds to one first type of frequency domain unit and includes N sub-precoding matrices each of which corresponds to one of the N channel status information reference signal port groups.

In another aspect, a method of data communication is disclosed. The method includes transmitting, by a communication node, channel status information reference signals on N channel status information reference signal port groups, wherein N is a positive integer, receiving, by the communication node, from a communication device, a report including a precoding matrix indicator that includes information about a first type of vector, wherein the first type of vector includes C elements, and each of the C elements corresponds to one first type of frequency domain unit, wherein C is a positive integer, determining, by the communication node, C precoding matrices based on the received report, wherein each of the C precoding matrices corresponds to one first type of frequency domain unit and includes N sub-precoding matrices each of which corresponds to one of the N channel status information reference signal port groups.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWINGS

FIG. 4 shows an example relationship between CSI-RS resource groups, CSI-RS port groups and transmitter-receiver points (TRPs) based on some embodiments of the disclosed technology.

FIG. 5 shows an example of a process for wireless communication based on some example embodiments of the disclosed technology.

FIG. 6 shows another example of a process for wireless communication based on some example embodiments of the disclosed technology.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
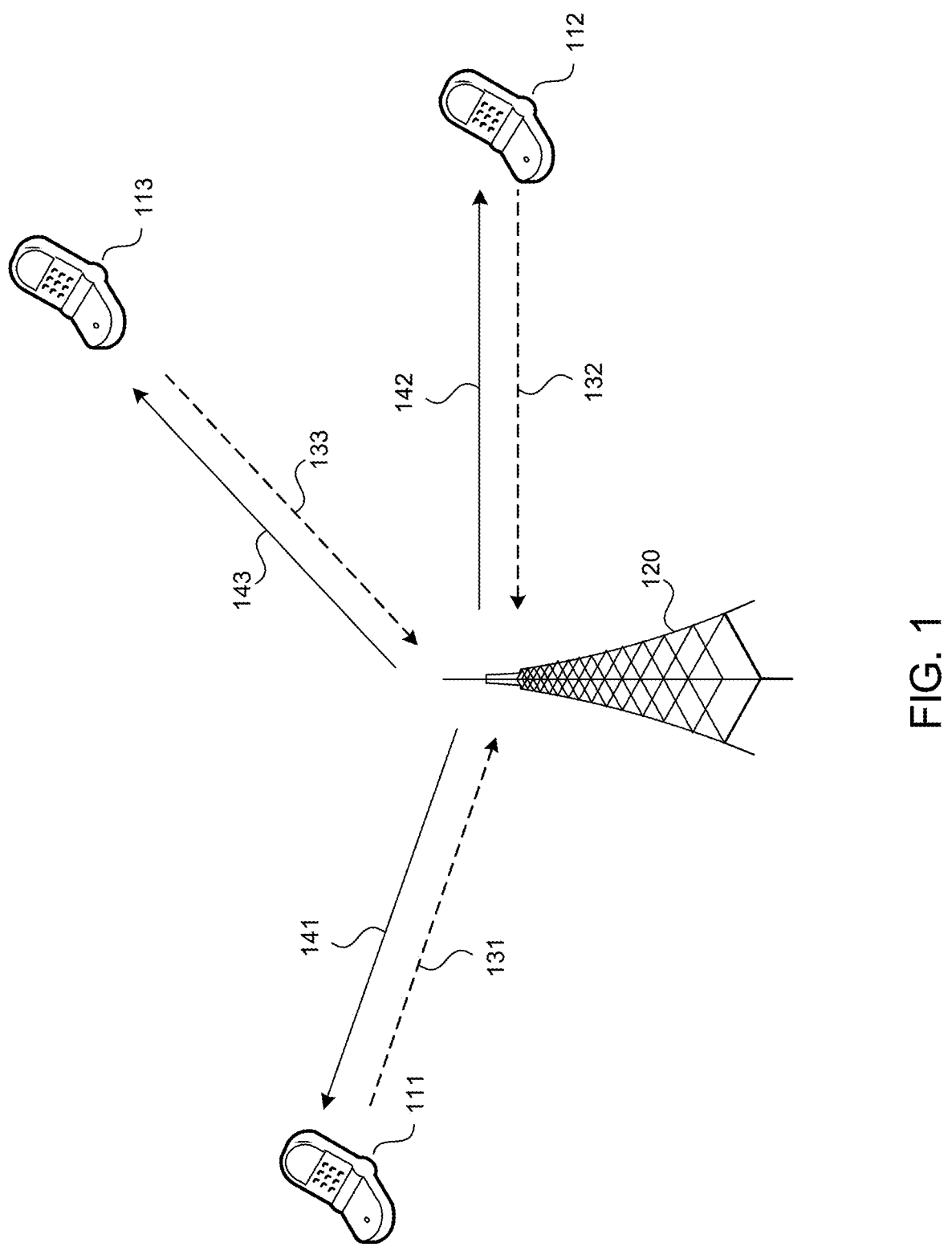
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
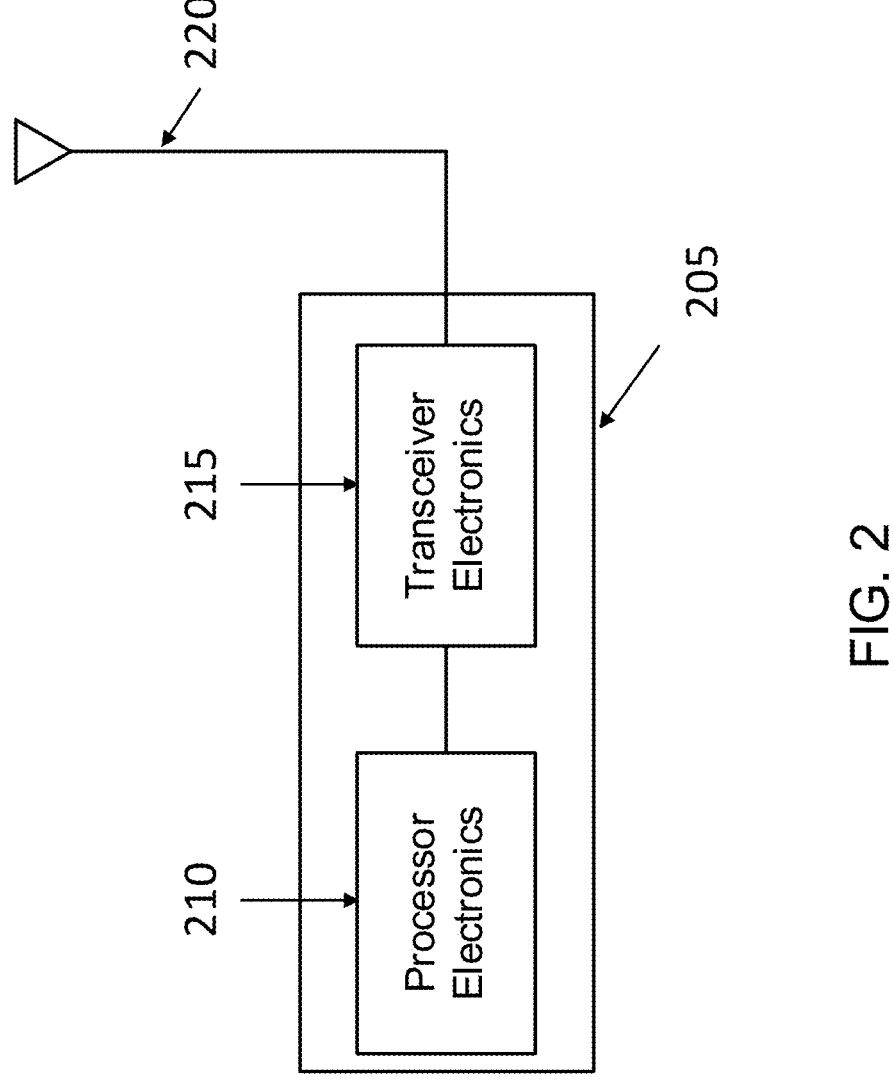
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

Example 1

The UE measures N CSI-RS port groups and obtains a precoding matrix based on the N CSI-RS port groups for each first type of frequency domain unit $t_1$, $t_1=0$, 1, . . . $F_4$ of $F_4$ first type of frequency domain units. That is, the UE obtains $F_4$ precoding matrices, where $F_4$ is a positive integer. The $F_4$ precoding matrices correspond to one same quantities of layers. The UE reports a precoding matrix indicator (PMI), which indicates the $F_4$ precoding matrices. Each of the $F_4$ precoding matrices includes N sub precoding matrices each of which corresponds to one of the N CSI-RS port groups, where N is a positive integer (e.g., N is equal to or larger than 1). For example, for each first type of frequency domain unit $t_1$, $t_1=0$, 1, . . . $F_4$, the precoding matrix $W_{t_1}$ has the following format:

$$W_{t_1} = \begin{bmatrix} w_{t_1,0} \\ w_{t_1,1} \\ \vdots \\ w_{t_1,N-1} \end{bmatrix} \quad (1)$$

where $w_{t_1,j}$ corresponds to CSI-RS port group j, j=0, 1, . . . N-1.

The N $w_{t_1,j}$, j=0, 1, . . . N-1 corresponds to the same $v$ transmitted layers. For example, the UE obtains a channel quality indicator (CQI) based on the following transmission scheme:

$$z_j(r) = \begin{bmatrix} z_j^0(r) \\ z_j^1(r) \\ \vdots \\ z_j^{T_j-1}(r) \end{bmatrix} = W_{t_1,j}(r) \begin{bmatrix} x_0(r) \\ x_1(r) \\ \vdots \\ x_{v-1}(r) \end{bmatrix}, j = 0, 1, \ldots N-1 \quad (2)$$

where $w_{t_1,j}(r)$ is the corresponding precoding matrix $w_{t_1,j}$ of CSI-RS port group j applicable to $x_l(r)$, l=0, 1, . . . $v-1$. Here, $v$ is the number of layers indicated by the RI which is reported by UE or configured by gNB, and r is a resource index. For example, r is a resource element (RE) index, or a frequency domain unit index, such as a second type of frequency domain unit. The N signals $z_j(r)$, j=0, 1, . . . , N-1, may fully overlap in time and frequency domain. Each layer of the $v$ layers $x_l(r)$, l=0, 1, . . . $v-1$ are transmitted by the N CSI-RS port groups. $T_j$ is the number of CSI-RS ports included in CSI-RS port group with index j which is referred to as CSI-RS port group in some implementations discussed in this patent document. That is, the UE obtains CQI based on the following transmission scheme:

$$z(r) = \begin{bmatrix} z_0(r) \\ z_1(r) \\ \vdots \\ z_{N-1}(r) \end{bmatrix} = W_{t_1}(r) \begin{bmatrix} x_0(r) \\ x_1(r) \\ \vdots \\ x_{v-1}(r) \end{bmatrix}, j = 0, 1, \ldots N-1 \quad (3)$$

Figure 3:
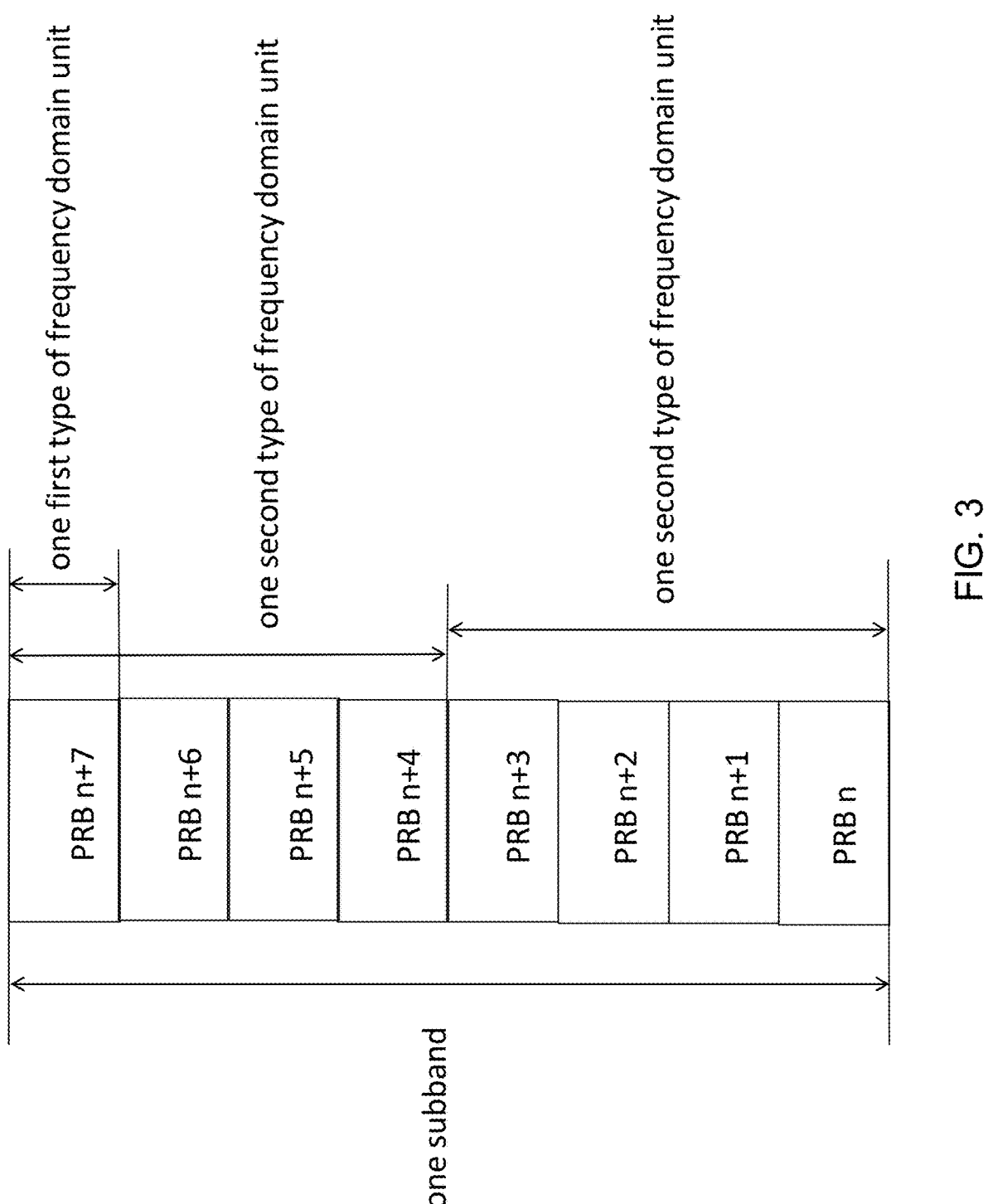
FIG. 3 shows an example of a subband that includes 8 physical resource blocks (PRBs) where one second type of frequency domain units includes 4 PRBs, one first type of frequency domain unit includes one PRB, and a second type of frequency domain unit includes 4 first type frequency domain units based on some embodiments of the disclosed technology.

FIG. 3 shows an example of a subband that includes 8 physical resource blocks (PRBs) where one second type of frequency domain units includes 4 PRBs, one first type of frequency domain unit includes one PRB, and a second type of frequency domain unit includes 4 first type frequency domain units based on some embodiments of the disclosed technology.

For each j, j=0, 1, . . . N-1, the $w_{t_1,j}$ is based on two types of vectors which includes a first type of vectors and a second type of vectors, where each element of the first type of vector corresponds to a first type of frequency domain unit $t_1$ and each element of the second type of vector corresponds to a second type of frequency domain unit $t_2$. In some implementations, the two types of vectors can be referred to as two types of frequency domain vector. In some implementations, the second type of frequency domain unit includes one or more of the first type of frequency domain units. In some implementations, one first type of frequency domain unit should only be in one second type of frequency domain units and shouldn't be in more than one second type of frequency domain unit. As shown in FIG. 3, one subband includes 8 PRBs and one second type of frequency domain units includes 4 PRBs, one first type of frequency domain unit includes one PRB, then a second type of frequency domain unit includes 4 first type frequency domain units. The gNB configures the number of the second type of frequency domain units included in one subband and the number of first type of frequency domain units in one subband. In some implementations, the gNB informs the UE of the number of the first type of frequency domain units in a second type of frequency domain unit and the number of the second type of frequency domain units included in one subband. In some implementations, the size of the first type of frequency domain unit can be based on at least one of: the value N, which is the number of CSI-RS port groups corresponding to the precoding matrix, subcarrier space, or the cyclic prefix. The larger the value N is, the smaller the size of the first type of frequency domain unit is. For example, the number of the first type of frequency domain units in a second type of frequency domain unit is based on N. In some implementations, the number of the first type of frequency domain units in a second type of frequency domain unit is N. The smallest size of the first type of frequency time domain unit is one physical resource block (PRB). Alternatively, the smallest size of the first type of frequency time domain unit is smaller than PRB, for example, the smallest size of the first type of frequency time domain unit includes 6 resource elements (REs), wherein one PRB includes 12 REs on one orthogonal frequency division multiplexing (OFDM) symbol. In some implementations, the smallest size of the first type of frequency domain unit depends on the value N, which is the number of CSI-RS port groups corresponding to the precoding matrix, subcarrier space, or the cyclic prefix. In some implementations, the $$\frac{1}{\Delta f * S} \leq CPlength,$$

wherein $\Delta f$ is a sub-carrier of the N CSI-RS port groups whose unit is Hz or a reference sub-carrier configured by the gNB or determined by a rule, S is the number of sub-carriers in one first type of frequency domain unit and CPlength is the length of a cyclic prefix. CPlength can be the length of a cyclic prefix of the N CSI-RS port groups, or is the length of an extended cyclic prefix which may be not associated with the N CSI-RS port groups. In some implementations, the size of first type of frequency domain unit is determined by the following formula:

$$S = \max\left(\left\lfloor \frac{1}{CPlength * \Delta f} \right\rfloor, \left\lfloor \frac{N_{PRB}^{SB} * 12}{R_2 * R_1} * \right\rfloor\right)$$

wherein $$N_{PRB}^{SB}$$

is the number of PRBs in one subband. $R_2$ is the number of the second type of frequency domain units in one subband. $R_1$ is the number of the first type of frequency domain units in one second type of frequency domain unit. S is the number of sub-carriers in one first type of frequency domain unit.

For each j, j=0, 1, ... N−1, the $w_{t_1,j}$ has $v$ columns each of which corresponds to one of $v$ layers and its $l^{th}$ column $$w_{t_1,j}^{l}$$

has one of following format:

$$w_{t_1,j}^{l} = \begin{bmatrix} w_{t_1,0,j}^{l} \\ w_{t_1,1,j}^{l} \end{bmatrix} = \tag{4}$$

$$\frac{1}{\beta_{l,j}} \begin{bmatrix} \sum_{i=0}^{L_j-1} v_{i,j} p_{i,0,j}^{(1)} p_{i,j}^{(3)} \varphi_{i,j}^{(3)} y_{t_1,l,j}^{(1)} \sum_{f=0}^{M_j-1} y_{t_2,l,f,j}^{(2)} p_{l,i,f,j}^{(2)} \varphi_{l,i,f,j}^{(2)} \\ \sum_{i=0}^{L_j-1} v_{i,j} p_{i,1,j}^{(1)} p_{i,j}^{(3)} \varphi_{i,j}^{(3)} y_{t_1,l,j}^{(1)} \sum_{f=0}^{M_j-1} y_{t_2,l,f,j}^{(2)} p_{l,i+L,f,j}^{(2)} \varphi_{l,i+L,f,j}^{(2)} \end{bmatrix} \tag{5}$$

$$w_{t_1,j}^{l} = \begin{bmatrix} w_{t_1,0,j}^{l} \\ w_{t_1,1,j}^{l} \end{bmatrix} =$$

$$\frac{1}{\beta_{l,j}} \begin{bmatrix} \sum_{i=0}^{L_j-1} v_{i,j} p_{i,0,j}^{(1)} p_{i,j}^{(3)} \varphi_{i,j}^{(3)} \varphi_{j}^{(4)} y_{t_1,l,j}^{(1)} \sum_{f=0}^{M_j-1} y_{t_2,l,f,j}^{(2)} p_{l,i,f,j}^{(2)} \varphi_{l,i,f,j}^{(2)} \\ \sum_{i=0}^{L_j-1} v_{i,j} p_{i,1,j}^{(1)} p_{i,j}^{(3)} \varphi_{i,j}^{(3)} \varphi_{j}^{(4)} y_{t_1,l,j}^{(1)} \sum_{f=0}^{M_j-1} y_{t_2,l,f,j}^{(2)} p_{l,i+L,f,j}^{(2)} \varphi_{l,i+L,f,j}^{(2)} \end{bmatrix} \tag{6}$$

$$w_{t_1,j}^{l} = \begin{bmatrix} w_{t_1,0,j}^{l} \\ w_{t_1,1,j}^{l} \end{bmatrix} =$$

-continued $$\frac{1}{\beta_{l,j}} \begin{bmatrix} \sum_{i=0}^{L_j-1} v_{i,j} p_{i,0,j}^{(1)} p_{i,j}^{(3)} y_{t_1,l,j}^{(1)} \sum_{f=0}^{M_j-1} y_{t_2,l,f,j}^{(2)} p_{l,i,f,j}^{(2)} \varphi_{l,i,f,j}^{(2)} \\ \sum_{i=0}^{L_j-1} v_{i,j} p_{i,1,j}^{(1)} p_{i,j}^{(3)} y_{t_1,l,j}^{(1)} \sum_{f=0}^{M_j-1} y_{t_2,l,f,j}^{(2)} p_{l,i+L,f,j}^{(2)} \varphi_{l,i+L,f,j}^{(2)} \end{bmatrix} \tag{7}$$

$$w_{t_1,j}^{l} = \begin{bmatrix} w_{t_1,0,j}^{l} \\ w_{t_1,1,j}^{l} \end{bmatrix} =$$

$$\frac{1}{\beta_{l,j}} \begin{bmatrix} \sum_{i=0}^{L_j-1} v_{i,j} p_{i,0,j}^{(1)} p_{i,j}^{(3)} \varphi_{j}^{(4)} y_{t_1,l,j}^{(1)} \sum_{f=0}^{M_j-1} y_{t_2,l,f,j}^{(2)} p_{l,i,f,j}^{(2)} \varphi_{l,i,f,j}^{(2)} \\ \sum_{i=0}^{L_j-1} v_{i,j} p_{i,1,j}^{(1)} p_{i,j}^{(3)} \varphi_{j}^{(4)} y_{t_1,l,j}^{(1)} \sum_{f=0}^{M_j-1} y_{t_2,l,f,j}^{(2)} p_{l,i+L,f,j}^{(2)} \varphi_{l,i+L,f,j}^{(2)} \end{bmatrix} \tag{8}$$

$$w_{t_1,j}^{l} = \begin{bmatrix} w_{t_1,0,j}^{l} \\ w_{t_1,1,j}^{l} \end{bmatrix} = \frac{1}{\beta_{l,j}} \begin{bmatrix} \sum_{i=0}^{L_j-1} v_{i,j} p_{i,0,j}^{(1)} y_{t_1,l,j}^{(1)} \sum_{f=0}^{M_j-1} y_{t_2,l,f,j}^{(2)} p_{l,i,f,j}^{(2)} \varphi_{l,i,f,j}^{(2)} \\ \sum_{i=0}^{L_j-1} v_{i,j} p_{i,1,j}^{(1)} y_{t_1,l,j}^{(1)} \sum_{f=0}^{M_j-1} y_{t_2,l,f,j}^{(2)} p_{l,i+L,f,j}^{(2)} \varphi_{l,i+L,f,j}^{(2)} \end{bmatrix} \tag{9}$$

$$w_{t_1,j}^{l} = \begin{bmatrix} w_{t_1,0,j}^{l} \\ w_{t_1,1,j}^{l} \end{bmatrix} =$$

$$\frac{1}{\beta_{l,j}} \begin{bmatrix} \sum_{i=0}^{L_j-1} v_{i,j} p_{i,0,j}^{(1)} \varphi_{j}^{(4)} y_{t_1,l,j}^{(1)} \sum_{f=0}^{M_j-1} y_{t_2,l,f,j}^{(2)} p_{l,i,f,j}^{(2)} \varphi_{l,i,f,j}^{(2)} \\ \sum_{i=0}^{L_j-1} v_{i,j} p_{i,1,j}^{(1)} \varphi_{j}^{(4)} y_{t_1,l,j}^{(1)} \sum_{f=0}^{M_j-1} y_{t_2,l,f,j}^{(2)} p_{l,i+L,f,j}^{(2)} \varphi_{l,i+L,f,j}^{(2)} \end{bmatrix}$$

wherein $v_{i,j}$ is spatial domain vector which can be referred to as a third type of vector and each element of $v_{i,j}$ corresponds to an antenna of the CSI-RS port group j. That is, the $v_{i,j}$ includes $$\frac{P_j}{2}$$

elements, wherein $P_j$ is the number of CSI-RS ports of CSI-RS port group j. In some implementations, $v_{i,j}$ id is a DFT/2D-DFT with $$\frac{P_j}{2}$$

elements. In another implementation, $v_{i,j}$ is a vector with only one element that equals 1 and the remaining $$\frac{P_j}{2} - 1$$

elements are 0.

$$p_{i,q,j}^{(1)}, q = 0, 1$$

is a phase value whose amplitude equals 1. If one of formulas (4)-(7) is adopted, for each j, one of $$p_{l,q,j}^{(1)}, q = 0, 1,$$

with fixed phase 0 is not reported by UE.

$$p_{l,j}^{(3)} \text{ and } P_{l,i,f,j}^{(2)}$$

are amplitude values whose phases equal 0.

$$p_{l,q,j}^{(1)} \text{ and } q = 0, 1,$$

$$P_{l,i,f,j}^{(2)} \text{ and } p_{l,j}^{(3)}$$

are amplitude values which are smaller than or equal to 1 and are larger than or equals to 0.

$$\varphi_{l,i,f,j}^{(2)}, \varphi_{l,j}^{(3)} \text{ and } \varphi_{j}^{(4)}$$

are phase values whose amplitudes equal to 1.

$$y_{t_1,l,j}^{(1)}$$

is an element with index $t_1$, $t_1 = 0, 1, \ldots F_4$ of the first type of vector $$y_{l,j}^{(1)}$$

which is specific to layer l and CSI-RS port group j.

$$y_{t_1,l,j}^{(1)}$$

corresponds to a first type frequency domain unit with index $t_1$.

$$y_{t_2,l,f,j}^{(2)}$$

is an element with index $t_2$, $t_2 = 0, 1, \ldots F_3$ of the $f^{th}$ second type vector $$y_{l,f,j}^{(1)}$$

which is specific to a layer l and CSI-RS port group j. Each $$w_{t_1,j}^{j}$$

is based on one first type of vector, $M_j$ second type of vectors and $L_j$ third type of vector $v_i$, wherein $M_j$ is a positive integer. In some implementations, $$y_{t_1,l,j}^{(1)} = e^{j\frac{2\pi n_{4,l,j} t_1}{F_4}}, \ n_{4,l,j} \in \{0,1 \ldots, F_4 - 1\}, t_1 = 0,1 \ldots, F_4 - 1$$

$$y_{t_2,l,j}^{(2)} = e^{j\frac{2\pi n_{3,l,j}^{f} t_2}{F_3}}, \ n_{3,l,j}^{f} \in \{0,1, \ldots F_3 - 1\},$$

$$t_2 = 0,1, \ldots F_3 - 1, f = 0,1, \ldots M_j - 1$$

$$\text{or } y_{t_2,l,j}^{(2)} = e^{j\frac{2\pi\left(n_{3,l,j}^{f} * R_1\right) t_2}{F_3 * R_1}}, \ n_{3,l,j}^{f} \in \{0,1, \ldots F_3 - 1\},$$

$$t_2 = 0,1, \ldots F_3 - 1, f = 0,1, \ldots M_j - 1$$

$$\text{or } y_{t_2,l,j}^{(2)} = e^{j\frac{2\pi\left(n_{3,l,j}^{f} * R_1\right) t_2}{F_4}}, \ n_{3,l,j}^{f} \in \{0,1, \ldots F_3 - 1\},$$

$$t_2 = 0,1, \ldots F_3 - 1, f = 0,1, \ldots M_j - 1$$

$F_4$ is the number of the first type of frequency domain units and $F_3$ is the number of the second type of frequency domain units, where $F_4 \geq F_3$. In some implementations, $F_4$ is a multiple of $F_3$.

In a first implementation for reporting information of the first type of vector and the second type of vector, the $$n_{3,l,j}^{0} = 0$$

and is not reported by the UE. The remaining $M_j - 1$ of $$n_{3,l,j}^{f}$$

is reported by the UE using $$C_{F_3}^{M_j - 1}$$

which represents a sequence of indices of $M_j - 1$ $$n_{3,l,j}^{f}$$

selected from $F_3$ index values, wherein $f = 1, 2, \ldots M_j - 1$. Alternatively, the remaining $M_j - 1$ of $$n_{3,l,j}^{f}$$

is reported by the UE using $$C_{2*M_j-1}^{M_j-1}$$

which represents a sequence of indices of $M_j-1$ $$n_{3,l,j}^f$$

selected from $2*M_j-1$ index values, wherein the UE also reports a value of $M_{initial} \in \{-2M_v+1, -2M_v+2, \ldots, 0\}$ by which the continuous $2*M_j$ second type of vector is determined. The reported $M_j-1$ of $$n_{3,l,j}^f$$

is $$n_{3,l,j}^f$$

after remapping operation, wherein the remapping operation refers to one of $$n_{3,l,j}^f = \left(n_{3,l,j}^f - n_{3,l,j}^{f*}\right)$$

mod $F_3$, $$n_{3,l,j}^f = \left(n_{3,l,j}^f - n_{3,l,j}^0\right), \ n_{3,l,j}^f = \left(\left(n_{3,l,j}^f - n_{3,l,j_l^*}^{f*}\right)*R_1\right)$$

mod $F_4$.

$$n_{3,l,j}^{f*}$$

corresponds to the strongest $$p_{l,i,f,j}^{(2)},$$

that is $$p_{l,i^*,f^*,j}^{(2)} = \max_{i,f} p_{l,i,j,f,j}^{(2)} \cdot f^* = 0$$

after the remapping operation. The $n_{4,l,j}$ is reported using $\lceil \log_2 F_4 \rceil$ bits. If the remapping operation refers to $$n_{3,l,j}^f = \left(n_{3,l,j}^f - n_{3,l,j}^0\right),$$

10 the UE reports $$f_{l,j}^*$$

for each layer and each j.

In a second implementation for reporting information of the first type of vector and the second type of vector, the UE reports $M_j$ indices of $$n_{3,l,j}^f$$

using $$C_{F_3}^{M_j}$$

or using $$C_{2*M_j}^{M_j}$$

and $M_{initial}$. The reported $M_j$ indices of $$n_{3,l,j}^f$$

without remapping operation. The UE also reports a value x using $\lceil \log_2 R_1 \rceil$, wherein $R_1$ is the number of the first type frequency units in one second frequency domain unit.

$$n_{4,l,j} = R_1 n_{3,l,j}^0 + x$$

or $$n_{4,l,j} = R_1 n_{3,l,j}^{f_{l,j}^*} + x,$$

wherein the UE reports $$f_{l,j}^*$$

corresponds to strongest amplitude of $$p_{l,i,f,j}^{(2)},$$

that is, $$p_{l,i^*,f^*,j}^{(2)} = \max_{i,f} p_{l,i,f,j}^{(2)} \cdot f_{l,j}^*$$

may not be 0 and should be reported to gNB. In another implementation, the $n_{4,l,j}$ is reported using $\lceil \log_2 F_4 \rceil$ bits. For each j, $M_j$ indices of $$n_{3,i,j}^{f}$$

increase while $f$ increases.

In a first implementation for reporting coefficient $$p_{l,q,j}^{(1)}, \; p_{l,j}^{(3)}, \; \varphi_{l,j}^{(3)}, \; p_{l,i,f,j}^{(2)}, \; \varphi_{l,i,f,j}^{(2)},$$

the UE reports index $$i_{l,j}^{*}$$

or index $$i_{l,j}^{*}$$

and $$f_{l,j}^{*}$$

corresponding to strongest amplitude for each layer l and each CSI-RS port group j. Then for each layer l and each CSI-RS port group $$j, \; p_{l,\lfloor i_{l,j}^{*}/L_{j}\rfloor,j}^{(1)} = 1, \; p_{l,i_{l,j}^{*},f_{l,j}^{*},j}^{(2)} = 1$$

and are not reported by the UE for each j. The UE reports j*$_l$ corresponding to maximum value of $$p_{l,j}^{(3)}$$

for each layer l, l∈{1, 2, . . . ν}, that is, $$p_{l,j_{l,j}^{*}}^{(3)} = \max_{j} p_{l,j}^{(3)}.$$

Then $$p_{l,j_{l}^{*}}^{(3)} = 1, \; \varphi_{l,j_{l}^{*}}^{(3)} = 1$$

and $$p_{l,j_{l}^{*}}^{(3)}$$

and $$\varphi_{l,j_{l}^{*}}^{(3)}$$

are not reported by the UE. The remaining N−1 of $$p_{l,j}^{(3)}$$

and $$\varphi_{l,j}^{(3)}$$

should be reported by the UE for $$j \neq j_{l}^{*}.$$

In this case, one of formulas (4)-(7) is optimal. There are N strongest $$p_{l,i_{l,j}^{*},f_{l,j}^{*},j}^{(2)}$$

whose values equal 1 and are not reported to gNB for each layer. Furthermore, if $$\varphi_{l,i_{l,j}^{*},f_{l,j}^{*},j}^{(2)} = 1$$

and is not reported to gNB, then formula (4) or (5) is adopted. If $$\varphi_{l,i_{l,j}^{*},f_{l,j}^{*},j}^{(2)}$$

is reported to gNB, then formula (6) or (7) is adopted.

In a second implementation for reporting coefficient $$p_{l,q,j}^{(1)}, \; p_{l,j}^{(3)}, \; \varphi_{l,j}^{(3)}, \; p_{l,i,f,j}^{(2)}, \; \varphi_{l,i,f,j}^{(2)},$$

the UE reports i*$_l$, f*$_l$, j*$_l$ corresponding to maximum value for each layer l, that is $$p_{l,i_{l}^{*},f_{l}^{*},j_{l}^{*}}^{(2)} = \max_{i,f,j} p_{l,i,j,f,j}^{(2)}, \; \text{then} \; p_{l,i_{l}^{*},f_{l}^{*},j_{l}^{*}}^{(2)} = 1,$$

$$p_{l,\lfloor i_{l}^{*}/L_{j}^{*}\rfloor,j_{l}^{*}}^{(1)} = 1, \; p_{l,j_{l}^{*}}^{(3)} = 1, \; \varphi_{l,j_{l}^{*}}^{(3)} = 1$$

and aren't reported by the UE. The UE should report the remaining 2N−1 of $$p_{l,q,j}^{(1)}, \; j \neq j^{*}, q \neq \lfloor i/L_{j^{*}}\rfloor$$

and the remaining N−1 of $$p_{l,j}^{(3)}$$

and $$\varphi_{l,j}^{(3)}$$

for j≠j*. In this case one of formula (4-9) is optimal. There is only one strongest $$p_{l,i_l^*,f_l^*,j_l^*}^{(2)}$$

whose value equals to 1 and is not reported to gNB for each layer. Furthermore, if $$\varphi_{l,i_l^*,f_l^*,j_l^*}^{(2)} = 1$$

and isn't reported to gNB, then one of formula (4) or (5) is adopted. If $$\varphi_{l,i^*,f^*,j^*}^{(2)}$$

is reported to gNB, then one of formulas (6)-(9) is adopted.

In a third implementation for reporting coefficient $$p_{l,q,j}^{(1)}, p_{l,j}^{(3)}, p_{l,i,f,j}^{(2)}, \varphi_{l,i,f,j}^{(2)},$$

the UE reports i*, f*, j* corresponding to maximum value for each layer l, that is $$p_{l,i^*,f^*,j^*}^{(2)} = \max_{i,f,j} p_{l,i,f,j}^{(2)},$$

then $$p_{l,i^*,f^*,j^*}^{(2)} = 1,$$

$$\varphi_{l,i^*,f^*,j^*}^{(2)} = 1, p_{l,\lfloor i^*/L^*\rfloor,j^*}^{(1)} = 1, p_{l,j^*}^{(3)} = 1$$

and aren't reported by the UE. The UE should report the remaining 2N−1 of $$p_{l,q,j}^{(1)}, j \neq j^*, q \neq \lfloor i/L_{j^*}\rfloor$$

and the remaining N−1 of $$p_{l,j}^{(3)}$$

for j≠j*. In this case formula (6-7) is optimal.

In a fourth implementation for reporting coefficient $$p_{l,q,j}^{(1)}, p_{l,i,f,j}^{(2)}, \varphi_{l,i,f,j}^{(2)},$$

the UE reports i*, f*, j* corresponding to the maximum value for each layer l, that is $$p_{l,i^*,f^*,j^*}^{(2)} = \max_{i,f,j} p_{l,i,f,j}^{(2)},$$

then $$p_{l,i^*,f^*,j^*}^{(2)} = 1,$$

$$\varphi_{l,i^*,f^*,j^*}^{(2)} = 1,$$

$$p_{l,\lfloor i^*/L_j^*\rfloor,j^*}^{(1)} = 1$$

and are not reported by the UE. The UE should report the remaining 2N−1 of $$p_{l,q,j}^{(1)}, j \neq j^*, q \neq \lfloor i/L_{j^*}\rfloor.$$

In this case, formulas (8)-(9) are optimal.

In the third and fourth implementations, i*, f*, j* can also be referred to as i*_l, f*_l, j*_l because it is reported for each layer.

In a first implementation for reporting the non-zero values of $$p_{l,i,f,j}^{(2)}$$

and $$\varphi_{l,i,f,j}^{(2)},$$

a bitmap indication is indicated for each $$w_{t_1,j}^j$$

respectively. For each layer l and j, the UE reports a bitmap with $2*L_j*M_j$ or $2*L_j*M_j-1$ bits where the bitmap has no bit corresponding to $$p_{l,i_{l,j}^*,f_{l,j}^*,j}^{(2)}$$

and $$\varphi^{(2)}_{l,i^*_{l,j},f^*_{l,j},j}.$$

If a bit corresponding to i, $f$ is indicated to be 1 in the bitmap, then the UE will report $$p^{(2)}_{l,i,f,j}$$

and $$\varphi^{(2)}_{l,i,f,j}$$

except at least one of $$p^{(2)}_{l,i^*_{l,j},f^*_{l,j},j},\ \varphi^{(2)}_{l,i^*_{l,j},f^*_{l,j},j},\ p^{(2)}_{l,i^*_{l,j},f^*_{l,j},j},$$

or $$\varphi^{(2)}_{l,i^*_{l,j},f^*_{l,j},j}.$$

If a bit corresponding to i, $f$ is indicated to be 0 in the bitmap, then the UE doesn't report $$p^{(2)}_{l,i,f,j}$$

and $$\varphi^{(2)}_{l,i,f,j}$$

where $$p^{(2)}_{l,i,f,j} = 0.$$

The number of non-zeros values in the bitmap for each layer and each j.

In a second implementation for reporting the non-zero values of $$p^{(2)}_{l,i,f,j}$$

amd $$\varphi^{(2)}_{l,i,f,j},$$

for each layer l, the UE reports a bitmap with $$\sum_{j=0}^{N-1} 2*L_j*M_j \ \text{ or } \ \sum_{j=0}^{N-1} 2*L_j*M_j - 1 \ \text{ bits,}$$

one bit of the bitmap corresponds to one layer l, one $f$ and one j. If a bit corresponding to i, $f$, j is indicated to be 1 in the bitmap, then the UE will report $$p^{(2)}_{l,i,f,j}$$

and $$\varphi^{(2)}_{l,i,f,j}$$

except at least one of $$p^{(2)}_{l,i^*_{l,j},f^*_{l,j},j},\ \varphi^{(2)}_{l,i^*_{l,j},f^*_{l,j},j},\ p^{(2)}_{l,i^*_{l,j},f^*_{l,j},j},\ \text{or} \ \varphi^{(2)}_{l,i^*_{l,j},f^*_{l,j},j}.$$

If a bit corresponding to i, $f$, j is indicated to be 0 in the bitmap, then the UE doesn't report $$p^{(2)}_{l,i,f,j}$$

and $$\varphi^{(2)}_{l,i,f,j}$$

where $$p^{(2)}_{l,i,f,j} = 0.$$

The number of non-zeros values in the bitmap for each layer and each j. In formulas (5), (7), and (9), the UE needs to report a phase coefficient $$\varphi^{(4)}_j$$

which is common to all layers, the UE reports $$j^*_l$$

corresponding to the strongest value of $$p^{(3)}_{l,j}$$

for each layer. Then, for a predefined layer, such as the first layer $$l = 1, \varphi_{j_1^*}^{(4)} = 1$$

is not reported by the UE. The UE reports the remaining N−1 of $$\varphi_j^{(4)}, j \neq j_1^*,$$

wherein $$j_1^*$$

corresponds to the strongest value among N of $$p_{1,j}^{(3)}$$

for a first layer. In another implementation, $$\varphi_0^{(4)} = 1$$

is not reported by the UE. The UE reports the remaining N−1 of $$\varphi_j^{(4)}, j \neq 0.$$

In a first implementation for reporting $$\varphi_j^{(4)}, j \neq j_1^*, \text{ or } j \neq 0,$$

the period of reporting $$\varphi_j^{(4)}$$

and the period of reporting other information such as $$v_{i,j}, y_{l,j}^{(1)}, y_{l,f,j}^{(2)}, p_{l,q,j}^{(1)}, p_{l,i,f,j}^{(2)}, \varphi_{l,i,f,j}^{(2)}, p_{l,j}^{(3)}, \varphi_{l,j}^{(3)}$$

can be the same. In a second implementation for reporting $$\varphi_j^{(4)}, j \neq j_1^*, \text{ or } j \neq 0,$$

the period of reporting $$\varphi_j^{(4)}$$

and the period of reporting other information such as $$v_{i,j}, y_{l,j}^{(1)}, y_{l,f,j}^{(2)}, p_{l,q,j}^{(1)}, p_{l,i,f,j}^{(2)}, \varphi_{l,i,f,j}^{(2)}, p_{l,j}^{(3)}, \varphi_{l,j}^{(3)}$$

can be different, for example, the former is shorter than the latter. One latter period includes multiple former periods. In a third implementation for reporting $$\varphi_j^{(4)}, j \neq j_1^*, \text{ or } j \neq 0,$$

the first period of reporting $$\varphi_j^{(4)}$$

and at least one of $$p_{l,q,j}^{(1)}, p_{l,i,f,j}^{(2)}, \varphi_{l,i,f,j}^{(2)}, p_{l,j}^{(3)}, \varphi_{l,j}^{(3)}$$

and the second period of reporting $$v_{i,j}, y_{l,j}^{(1)}, y_{l,f,j}^{(2)}$$

can be different. The first period is shorter than the second period. The second period includes multiple first periods. In a fourth implementation for reporting $$\varphi_j^{(4)}, j \neq j_1^*, \text{ or } j \neq 0,$$

the first period of reporting $$\varphi_j^{(4)} p_{l,q,j}^{(1)}, p_{l,i,f,j}^{(2)}, \varphi_{l,i,f,j}^{(2)}, p_{l,j}^{(3)}, \varphi_{l,j}^{(3)}$$

and the second period of reporting $$v_{i,j}, y_{l,j}^{(1)}, y_{l,f,j}^{(2)}$$

can be the same, but $$\varphi_j^{(4)}, j \neq j_1^*, \text{ or } j \neq 0$$

of multiple occasions of the N CSI-RS port groups can be reported together using a set of fourth type of vectors. Each of the fourth type of vectors includes multiple elements each of which corresponds to one occasion of the N CSI-RS port groups. For example, there are 4 occasions of the N CSI-RS port groups. Each of the 4 occasions includes N CSI-RS port groups. The fourth type of vector include 4 elements or more than 4 elements each of which corresponds to one time domain unit. For example, $$\varphi_{j,t}^{(4)} = \sum_{z=0}^{Z_j-1} p_j^{(4)} e^{\frac{j*2*\pi n_{5,j}^z t}{T}}, n_{5,j}^z \in \{0,1, \dots, T-1\}, t = 0,1, \dots, T-1,$$

wherein $$\varphi_{j,t}^{(4)}$$

is $$\varphi_j^{(4)}$$

corresponding to time domain unit t. Similarly for other information of $$p_{l,q,j}^{(1)}, p_{l,i,f,j}^{(2)}, \varphi_{l,i,f,j}^{(2)}, p_{l,j}^{(3)}, \varphi_{l,j}^{(3)}$$

can also be reported using a respective vector. Each element of the vector corresponds to one time unit index t. For the 4 occasions or more than one occasion, each of $$v_{i,j}, y_{l,j}^{(1)}, y_{l,f,j}^{(2)}$$

is the same, i.e., each of $$v_{i,j}, y_{l,j}^{(1)}, y_{l,f,j}^{(2)}$$

only has the same value for the more than one occasion and does not change while the time domain unit index changes In some implementations, the first type of frequency domain unit and the second type of frequency domain unit are the same, then $t_1=t_2$, $F_3=F_4$, the $R_{11}$ is the number of the first type of frequency domain units in one subband. The $R_{11}$ depends on at least one of: N, the bandwidth of BWP, sub-carrier space, or cp (cyclic prefix) length. The larger the N is, the larger $R_{11}$ is. For example, $R_{11}$ can be larger than 2. The size of first type of frequency domain unit can be one PRB or smaller than one PRB. The $$w_{t_1,j}^j$$

has one of the following formats.

$$w_{t_1,j}^j = \begin{bmatrix} w_{t_1,0,j}^j \\ w_{t_1,1,j}^j \end{bmatrix} = \tag{10}$$

-continued $$\frac{1}{\beta_{l,j}} \begin{bmatrix} \sum_{i=0}^{L_j-1} v_{i,j} p_{l,0,j}^{(1)} p_{l,j}^{(3)} \varphi_{l,j}^{(3)} \sum_{f=0}^{M_j-1} y_{t_1,l,f,j}^{(2)} p_{l,i,f,j}^{(2)} \varphi_{l,i,f,j}^{(2)} \\ \sum_{i=0}^{L_j-1} v_{i,j} p_{l,1,j}^{(1)} p_{l,j}^{(3)} \varphi_{l,j}^{(3)} \sum_{f=0}^{M_j-1} y_{t_1,l,f,j}^{(2)} p_{l,i+L,f,j}^{(2)} \varphi_{l,i+L,f,j}^{(2)} \end{bmatrix} \tag{11}$$

$$w_{t_1,j}^j = \begin{bmatrix} w_{t_1,0,j}^j \\ w_{t_1,1,j}^j \end{bmatrix} =$$

$$\frac{1}{\beta_{l,j}} \begin{bmatrix} \sum_{i=0}^{L_j-1} v_{i,j} p_{l,0,j}^{(1)} p_{l,j}^{(3)} \varphi_{l,j}^{(3)} \varphi_j^{(4)} \sum_{f=0}^{M_j-1} y_{t_1,l,f,j}^{(2)} p_{l,i,f,j}^{(2)} \varphi_{l,i,f,j}^{(2)} \\ \sum_{i=0}^{L_j-1} v_{i,j} p_{l,1,j}^{(1)} p_{l,j}^{(3)} \varphi_{l,j}^{(3)} \varphi_j^{(4)} \sum_{f=0}^{M_j-1} y_{t_1,l,f,j}^{(2)} p_{l,i+L,f,j}^{(2)} \varphi_{l,i+L,f,j}^{(2)} \end{bmatrix} \tag{12}$$

$$w_{t_1,j}^j = \begin{bmatrix} w_{t_1,0,j}^j \\ w_{t_1,1,j}^j \end{bmatrix} = \frac{1}{\beta_{l,j}} \begin{bmatrix} \sum_{i=0}^{L_j-1} v_{i,j} p_{l,0,j}^{(1)} p_{l,j}^{(3)} \sum_{f=0}^{M_j-1} y_{t_1,l,f,j}^{(2)} p_{l,i,f,j}^{(2)} \varphi_{l,i,f,j}^{(2)} \\ \sum_{i=0}^{L_j-1} v_{i,j} p_{l,1,j}^{(1)} p_{l,j}^{(3)} \sum_{f=0}^{M_j-1} y_{t_1,l,f,j}^{(2)} p_{l,i+L,f,j}^{(2)} \varphi_{l,i+L,f,j}^{(2)} \end{bmatrix} \tag{13}$$

$$w_{t_1,j}^j = \begin{bmatrix} w_{t_1,0,j}^j \\ w_{t_1,1,j}^j \end{bmatrix} =$$

$$\frac{1}{\beta_{l,j}} \begin{bmatrix} \sum_{i=0}^{L_j-1} v_{i,j} p_{l,0,j}^{(1)} p_{l,j}^{(3)} \varphi_j^{(4)} \sum_{f=0}^{M_j-1} y_{t_1,l,f,j}^{(2)} p_{l,i,f,j}^{(2)} \varphi_{l,i,f,j}^{(2)} \\ \sum_{i=0}^{L_j-1} v_{i,j} p_{l,1,j}^{(1)} p_{l,j}^{(3)} \varphi_j^{(4)} \sum_{f=0}^{M_j-1} y_{t_1,l,f,j}^{(2)} p_{l,i+L,f,j}^{(2)} \varphi_{l,i+L,f,j}^{(2)} \end{bmatrix} \tag{14}$$

$$w_{t_1,j}^j = \begin{bmatrix} w_{t_1,0,j}^j \\ w_{t_1,1,j}^j \end{bmatrix} = \frac{1}{\beta_{l,j}} \begin{bmatrix} \sum_{i=0}^{L_j-1} v_{i,j} p_{l,0,j}^{(1)} \varphi_j^{(4)} \sum_{f=0}^{M_j-1} y_{t_1,l,f,j}^{(2)} p_{l,i,f,j}^{(2)} \varphi_{l,i,f,j}^{(2)} \\ \sum_{i=0}^{L_j-1} v_{i,j} p_{l,1,j}^{(1)} \varphi_j^{(4)} \sum_{f=0}^{M_j-1} y_{t_1,l,f,j}^{(2)} p_{l,i+L,f,j}^{(2)} \varphi_{l,i+L,f,j}^{(2)} \end{bmatrix} \tag{15}$$

$$y_{t_1,l,f,j}^{(2)} = e^{j\frac{2\pi n_{4,l,j}^f t2}{F_4}}, n_4^f \in \{0,1, \dots F_4-1\},$$

$$t_1 = 0,1, \dots F_4-1, f = 0,1, \dots M_j-1.$$

In a first implementation case for reporting $$n_{4,l,j}^f, f = 0, 1, \dots, M_j-1,$$

the UE reports $M_j$ of $$n_{4,l,j}^f, f = 0, 1, \dots, M_j-1$$

for each j=0, 1, . . . N−1. The reported $M_j$ of $$n_{4,l,j}^f, f = 0, 1, \ldots, M_j - 1$$

for each j=0, 1, . . . N−1 is without remapping. If N is 1, then the UE can report $M_j$−1 of $$n_{4,l,j}^f, f = 1, \ldots, M_j - 1$$

after remapping operation and does not report $$n_{4,l,j}^0 = 0.$$

If N is larger than 1, the UE reports $M_j$ of $$n_{4,l,j}^f, f = 0, 1, \ldots, M_j - 1$$

for each j=0, 1, . . . N−1. The reported $M_j$ of $$n_{4,l,j}^f, f = 0, 1, \ldots, M_j - 1$$

for each j=0, 1, . . . N−1 is without remapping operation.

In a second implementation case for reporting $$n_{4,l,j}^f, f = 0, 1, \ldots, M_j - 1,$$

the UE reports $M_j$ of $$n_{4,l,j}^f, f = 0, 1, \ldots, M_j - 1$$

for each j=0, 1, . . . N=1, j≠j*$_i$ and the UE reports $M_j$−1 of $$n_{4,l,j}^f, f = 0, 1, \ldots, M_j - 1,$$

f≠f*$_l$ for j≠j*$_l$. The reported $$n_{4,l,j}^f, f = 0, 1, \ldots, M_j - 1$$

is after remapping operation which refers to $$n_{4,l,j}^f = \left( n_{4,l,j}^f - n_{4,l,j_l^*}^{f_l^*} \right) \bmod F_4.$$

In some implementations, the N CSI-RS port groups can include the same or different numbers of antenna ports. If they include the same number of antenna ports, then the subscript of $P_j$ can be ignored, that is $P_j$=P.

In the above implementation, the $$y_{t_1,l,j}^{(1)}, y_{t_2,l,f,j}^{(2)}$$

and $$y_{t_1,l,f,j}^{(2)}$$

is specific to each layer l. In another implementation, $$y_{t_1,l,j}^{(1)}, y_{t_2,l,f,j}^{(2)}$$

and $$y_{t_1,l,f,j}^{(2)}$$

is shared by v layers. Then $$y_{t_1,l,j}^{(1)}, y_{t_2,l,f,j}^{(2)}$$

and $$y_{t_1,l,f,j}^{(2)}$$

can be represented by $$y_{t_1,j}^{(1)}, y_{t_2,f,j}^{(2)}$$

and $$y_{t_1,f,j}^{(2)}$$

respectively. Then the subscript l in $$n_{4,l,j}, n_{3,l,j}^f, n_{4,l,j}^f f_l^*,$$

and f*$_{l,j}$ can be deleted.

In the above implementation, the $$y_{t_1,l,j}^{(1)}, y_{t_2,l,f,j}^{(2)}$$

and

are specific to each layer j. In another implementation, $$y_{t_1,l,j}^{(1)}, y_{t_2,l,f,j}^{(2)}$$

and $$y_{t_1 l,f,j}^{(2)}$$

are shared by N CSI-RS port groups. Then the subscript j in $$y_{t_1,l,j}^{(1)}, y_{t_2,l,f,j}^{(2)} y_{t_1,l,f,j}^{(2)}, n_{4,l,j}, n_{3,l,j}^f, n_{4,l,j}^f f_l^*, f_{l,j}^*, M_j$$

can be deleted. $n_{4,l,j}$, $$n_{3,l,j}^f, n_{4,l,j}^f f_l^*, f_{l,j}^*$$

are reported once for N CSI-RS port groups instead of reporting for each j. In some implementations, $$y_{t_1,l,j}^{(1)}, y_{t_2,l,f,j}^{(2)}$$

and $$y_{t_1,l,f,j}^{(2)}$$

are shared by a sub-set of N CSI-RS port groups, then the j in $$y_{t_1,l,j}^{(1)}, y_{t_2,l,f,j}^{(2)} y_{t_1,l,f,j}^{(2)}, n_{4,l,j}, n_{3,l,j}^f, n_{4,l,j}^f f_l^*, f_{l,j}^*, M_j$$

can be replaced with the sub-set index j' which is the sub-set index. One sub-set includes one or more CSI-RS port group.

In some implementations, $$y_{t_1,l,j}^{(1)}, y_{t_2,l,f,j}^{(2)}$$

and $$y_{t_1,l,f,j}^{(2)}$$

are shared by N CSI-RS port groups and v layers. Then the j and l in $$y_{t_1,l,j}^{(1)}, y_{t_2,l,f,j}^{(2)} y_{t_1,l,f,j}^{(2)}, n_{4,l,j}, n_{3,l,j}^f, n_{4,l,j}^f f_l^*,$$

and $f^*_{l,j}$, $M_j$ can be deleted.

In some implementations, $$y_{t_1,l,j}^{(1)}, y_{t_2,l,f,j}^{(2)}$$

and $$y_{t_1,l,f,j}^{(2)}$$

are shared by one set of CSI-RS port group with index x, x=0, 1, . . . X−1. The N CSI-RS port groups are divided to one or more CSI-RS port group Then the j in $$y_{t_1,l,j}^{(1)}, y_{t_2,l,f,j}^{(2)} y_{t_1,l,f,j}^{(2)}, n_{4,l,j}, n_{3,l,j}^f, n_{4,l,j}^f f_l^*, \text{ and } f_{l,j}^*,$$

and $f^*_{l,j}$, $M_j$ can be replaced with x. For example, the formula (5) can be replaced with.

$$w_{t_1,j,x}^l = \begin{bmatrix} w_{t_1,0,x}^l \\ w_{t_1,1,x}^l \end{bmatrix} =$$

$$\frac{1}{\sqrt{\gamma_{l,j}}} \begin{bmatrix} \sum_{i=0}^{L_j-1} v_{i,j} p_{i,0,j}^{(1)} p_{l,j}^{(3)} \varphi_{l,j}^{(3)} \varphi_j^{(4)} y_{t_1,l,x}^{(1)} \sum_{f=0}^{M_j-1} y_{t_2,l,f,j}^{(2)} p_{l,i,f,j}^{(2)} \varphi_{l,i,f,j}^{(2)} \\ \sum_{i=0}^{L_j-1} v_{i,j} p_{l,1,j}^{(1)} p_{l,j}^{(3)} \varphi_{l,j}^{(3)} \varphi_j^{(4)} y_{t_1,l,x}^{(1)} \sum_{f=0}^{M_j-1} y_{t_2,l,f,j}^{(2)} p_{l,i+L,f,j}^{(2)} \varphi_{l,i+L,f,j}^{(2)} \end{bmatrix}$$

Formulas (4)-(15) can be replaced similarly.

In some implementations, $L_j$ is specific to each j, and can be configured/determined respectively. In another implementation, it limits that $L_j$ across N CSI-RS port group are same and not specific to each j. That is $L_j=L$.

In some implementations, $M_j$ is specific to each j, and can be configured or determined respectively for each j. In another implementation, it limits that $M_j$ across N CSI-RS port group are the same and are not specific to each j. That is $M_j=M$. In some implementations, the $M_j$ can be replaced by one of $M_v$, $M_{l,j}$, or $M_{l,v}$.

In some implementations, $\beta_{l,j}$ is specific to each layer l and each j. For example, $\beta_{l,j}$ satisfies one of following formula in the case that $v_{l,j}$ a vector with only one element that equals 1 and the remaining $$\frac{P_j}{2} - 1$$

elements are 0:

$$(\beta_{l,j})^2 = v * \left( \sum_{i=0}^{2*L_j-1} \left( p_{l,\lfloor i/L_j \rfloor,j}^{(1)} p_{l,j}^{(3)} \right)^2 \left| \sum_{f=0}^{M_j-1} y_{t_2,l,f,j}^{(2)} p_{l,i,f,j}^{(2)} \varphi_{l,i,f,j}^{(2)} \right|^2 \right) \quad (16)$$

$$\quad (17)$$

-continued $$(\beta_{l,j})^2 = \frac{v}{2} * \frac{\sum_{j_1=0}^{M_j-1}\left(\sum_{i=0}^{2*L_{j_1}-1}\left(p_{l,\lfloor i/L_{j_1}\rfloor,j_1}^{(1)}\,p_{l,j_1}^{(3)}\right)^2\right)\left(\left|\sum_{f=0}^{M_j-1}y_{t_2,l,f,j_1}^{(2)}\,p_{l,i,f,j_1}^{(2)}\,\varphi_{l,i,f,j_1}^{(2)}\right|^2\right)}{\left(\sum_{i=0}^{2*L_j-1}\left(p_{l,\lfloor i/L_j\rfloor,j}^{(1)}\,p_{l,j}^{(3)}\right)^2\right)\left(\left|\sum_{f=0}^{M_j-1}y_{t_2,l,f,j}^{(2)}\,p_{l,i,f,j}^{(2)}\,\varphi_{l,i,f,j}^{(2)}\right|^2\right)}$$

(18)

$$(\beta_{l,j})^2 = \min\left[\frac{v}{2} * \frac{\sum_{j_1=0}^{M_j-1}\left(\sum_{i=0}^{2*L_{j_1}-1}\left(p_{l,\lfloor i/L_{j_1}\rfloor,j_1}^{(1)}\,p_{l,j_1}^{(3)}\right)^2\right)\left(\left|\sum_{f=0}^{M_j-1}y_{t_2,l,f,j_1}^{(2)}\,p_{l,i,f,j_1}^{(2)}\,\varphi_{l,i,f,j_1}^{(2)}\right|^2\right)}{\left(\sum_{i=0}^{2*L_j-1}\left(p_{l,\lfloor i/L_j\rfloor,j}^{(1)}\,p_{l,j}^{(3)}\right)^2\right)\left(\left|\sum_{f=0}^{M_j-1}y_{t_2,l,f,j}^{(2)}\,p_{l,i,f,j}^{(2)}\,\varphi_{l,i,f,j}^{(2)}\right|^2\right)}, 1\right]$$

In some implementations, $\beta_{l,j}$ is specific to each layer and each j. For example, $\beta_{l,j}$ satisfies one of following formula in the case that $v_{l,j}$ is a DFT with $$\frac{P_j}{2}$$

elements:

$$(\beta_{l,j})^2 = v * P_j * \left(\sum_{i=0}^{2*L_j-1}\left(p_{l,\lfloor i/L_j\rfloor,j}^{(1)}\,p_{l,j}^{(3)}\right)^2\right)\left(\left|\sum_{f=0}^{M_j-1}y_{t_2,l,f,j}^{(2)}\,p_{l,i,f,j}^{(2)}\,\varphi_{l,i,f,j}^{(2)}\right|^2\right)$$

(19)

(20)

$$(\beta_{l,j})^2 = \frac{v}{2} * \frac{\sum_{j_1=0}^{M_j-1}P_j\left(\sum_{i=0}^{2*L_{j_1}-1}\left(p_{l,\lfloor i/L_{j_1}\rfloor,j_1}^{(1)}\,p_{l,j_1}^{(3)}\right)^2\right)\left(\left|\sum_{f=0}^{M_j-1}y_{t_2,l,f,j_1}^{(2)}\,p_{l,i,f,j_1}^{(2)}\,\varphi_{l,i,f,j_1}^{(2)}\right|^2\right)}{\left(\sum_{i=0}^{2*L_j-1}\left(p_{l,\lfloor i/L_j\rfloor,j}^{(1)}\,p_{l,j}^{(3)}\right)^2\right)\left(\left|\sum_{f=0}^{M_j-1}y_{t_2,l,f,j}^{(2)}\,p_{l,i,f,j}^{(2)}\,\varphi_{l,i,f,j}^{(2)}\right|^2\right)}$$

(22)

$$(\beta_{l,j})^2 = \min\left[\frac{v}{2} * \frac{\sum_{j_1=0}^{M_j-1}P_j\left(\sum_{i=0}^{2*L_{j_1}-1}\left(p_{l,\lfloor i/L_{j_1}\rfloor,j_1}^{(1)}\,p_{l,j_1}^{(3)}\right)^2\right)\left(\left|\sum_{f=0}^{M_j-1}y_{t_2,l,f,j_1}^{(2)}\,p_{l,i,f,j_1}^{(2)}\,\varphi_{l,i,f,j_1}^{(2)}\right|^2\right)}{\left(\sum_{i=0}^{2*L_j-1}\left(p_{l,\lfloor i/L_j\rfloor,j}^{(1)}\,p_{l,j}^{(3)}\right)^2\right)\left(\left|\sum_{f=0}^{M_j-1}y_{t_2,l,f,j}^{(2)}\,p_{l,i,f,j}^{(2)}\,\varphi_{l,i,f,j}^{(2)}\right|^2\right)}, 1\right]$$

In some implementations, $\beta_{l,j}$ is specific to each layer and is not specific to each j, that is $\beta_{l,j}$ can be referred to as $\beta_l$. If $v_{l,j}$ is a DFT/2D with $$\frac{P_j}{2}$$

elements, $\beta_l$ satisfies the following format:

$$(\beta_l)^2 = \sum_{j=0}^{M_j-1}P_j\left(\sum_{i=0}^{2*L_j-1}\left(p_{l,\lfloor i/L_j\rfloor,j_1}^{(1)}\,p_{l,j}^{(3)}\right)^2\right)\left(\left|\sum_{f=0}^{M_j-1}y_{t_2,l,f,j}^{(2)}\,p_{l,i,f,j}^{(2)}\,\varphi_{l,i,f,j}^{(2)}\right|^2\right)$$

If $v_{i,j}$ is a vector with only one element that equals 1 and the remaining $$\frac{P_j}{2} - 1$$

elements are 0, $\beta_l$ satisfies the following format:

$$(\beta_l)^2 = \sum_{j=0}^{M_j-1}\left(\sum_{i=0}^{2*L_j-1}\left(p_{l,\lfloor i/L_j\rfloor,j_1}^{(1)}\,p_{l,j}^{(3)}\right)^2\right)\left(\left|\sum_{f=0}^{M_j-1}y_{t_2,l,f,j}^{(2)}\,p_{l,i,f,j}^{(2)}\,\varphi_{l,i,f,j}^{(2)}\right|^2\right)$$

In some implementations, the size of the second frequency domain unit is independently determined/configured for each CSI-RS port group, that is, $R_2$ is specific to each CSI-RS port group, which is represented by $R_{2,j}$, and $F_3$ is specific to each CSI-RS port group, which is represented by $F_{3,j}$. The size of the second type of frequency domain unit for different CSI-RS port groups can be different. The smaller the size of the second type of frequency domain unit is, the larger the delay spread of the CSI-RS port group is. Different CSI-RS port groups are transmitted by different TRPs, the delay spread may be different for different TRPs. For example, the different TRPs correspond to different beam widths, then the delay spread for different TRPs may be different. In another implementation, the size of the second type of frequency domain unit is the same for different CSI-RS port groups. That is, $F_3$ is the same for N CSI-RS port groups and cannot be specific to each TRP.

In some implementations, the UE obtains one or multiple CQIs based on one or more of the $F_4$ precoding matrices. The multiple CQIs correspond to different codewords (also can be referred to as transport blocks) and/or corresponds to multiple second type of frequency domain units.

In some implementations, the N CSI-RS port groups are included in one CSI-RS resource. In another implementation, each of the N CSI-RS port groups corresponds to one CSI-RS resource. The N CSI-RS port groups are included in N CSI-RS resources.

In some implementations, similarly, the gNB can measure multiple SRS port groups transmitted by a UE and obtains a precoding matrix for each first type of frequency domain unit and informs about the multiple precoding matrices using the above methods in at least one of DCI, RRC, or MAC-CE, the UE transmits PUSCH/PUCCH/SRS/PRACH using the precoding matrix in each first type of the frequency domain units.

In some implementations, the gNB configures CSI parameter of each of the N CSI-RS port groups. The CSI parameter includes at least one of the number of third type vector (e.g., $L_j$), the number of third type vector (e.g., $M_j$), the number of none-zeros values in a bitmap, or a codebook restriction includes information about at least one of the following: which of multiple third type of vectors should not be reported/selected; which of multiple first type of vector should not be reported/selected; or which of multiple second type of vector should not be reported/selected.

In some implementations, the gNB configures CSI parameter for the N CSI-RS port groups, such as the total number of none-zero values in a bitmap which indicates none-zero values of $$p^{(2)}_{l,i,f,j}$$

across the N CSI-RS port groups, rank restriction.

In some implementations, the gNB configures a CSI-RS resource set which includes G CSI-RS resource groups, where G is a positive integer. The G CSI-RS resource groups corresponds to G CSI-RS resource group indicators (CR-GIs). Each CSI-RS resource group includes up to 4 CSI-RS resources. Each of the G CSI-RS resource group corresponds to one CRGI, which can also be referred to as CSI-RS resource indicator (CRI). The UE reports one or more CRGIs and PMIs for each reported CRGI.

If the CSI-RS resource group corresponding to one reported CRGI includes more than one CSI-RS resource, the PMI for the reported CRGI includes information for each CSI-RS resource using the methods described in Example 1, wherein one CSI-RS resource corresponds to one CSI-RS port group in Example 1, that is, N is larger than one. If the CSI-RS resource group corresponding to one reported CRGI includes only one CSI-RS resource, that is, N is larger than one, the precoding has one of the following formats:

$$w^j_{t_2} = \begin{bmatrix} w^j_{t_2,0} \\ w^j_{t_2,1} \end{bmatrix} = \frac{1}{\beta_l} \begin{bmatrix} \displaystyle\sum_{i=0}^{L_j-1} v_i p^{(1)}_{l,0} \sum_{f=0}^{M_j-1} y^{(2)}_{t_2,l,f} p^{(2)}_{l,i,f} \varphi^{(2)}_{l,i,f} \\ \displaystyle\sum_{i=0}^{L_j-1} v_i p^{(1)}_{l,1} \sum_{f=0}^{M_j-1} y^{(2)}_{t_2,l,f} p^{(2)}_{l,i+L,f} \varphi^{(2)}_{l,i+L,f} \end{bmatrix}$$

$$w^j_{t_2} = \begin{bmatrix} w^j_{t_2,0} \\ w^j_{t_2,1} \end{bmatrix} = \frac{1}{\beta_l} \begin{bmatrix} \displaystyle\sum_{i=0}^{L_j-1} v_i p^{(1)}_{l,0} \sum_{f=0}^{M_j-1} y^{(2)}_{t_2,f} p^{(2)}_{l,i,f} \varphi^{(2)}_{l,i,f} \\ \displaystyle\sum_{i=0}^{L_j-1} v_i p^{(1)}_{l,1} \sum_{f=0}^{M_j-1} y^{(2)}_{t_2,f} p^{(2)}_{l,i+L,f} \varphi^{(2)}_{l,i+L,f} \end{bmatrix}$$

If N is large than 1, the UE reports PMI that indicates a precoding matrix for each first type of frequency domain unit $t_1$. If N is 1, the UE reports PMI that indicates a precoding matrix for each second type of frequency domain unit $t_2$. The size of the first type of frequency domain unit is smaller than or equal to the second type of frequency domain unit.

In some implementations, the UE reports multiple CQIs for one CRI corresponding to one CSI-RS resource group including more than one CSI-RS resource. The multiple CQIs correspond to different combinations of CSI-RS resources in the one CSI-RS resource group.

In some implementations, the UE determines one CSI-RS resource group for each CJT PMI. Each group contains one or more CSI-RS resources and corresponds to one CJT transmission, and different resources in one CSI-RS resource group are from different CSI-RS resource sets. Different CSI-RS resource sets correspond to different TRPs. The UE reports CJT PMI for each selected CSI-RS resource group. The UE can determine the CSI-RS resource group using one of the following two methods:

Method 1: The UE determines the CSI-RS resource group according to gNB configuration. Using this method, gNB configures M CSI-RS resource groups, and then UE selects one or more CSI-RS resource groups. The UE reports several CRIs, each of which corresponds to one selected CSI-RS resource group, and CJT PMI for each reported CRI. Different CSI-RS resource groups can include different number of CSI-RS resources.

Method 2: UE selects CSI-RS resources for one CSI-RS resource group and reports CRIs for one CSI-RS resource group. Using this method, UE selects CSI-RS resources for one CSI-RS resource group from the N CSI-RS resource sets. The UE reports one or more CRIs for one CSI-RS resource group as group reporting and reports CJT PMI for the multiple CRIs. Different CSI-RS resource groups can include different numbers of CSI-RS resources.

FIG. 4 shows an example relationship between CSI-RS resource groups, CSI-RS port groups and transmitter/receiver points (TRPs) based on some embodiments of the disclosed technology.

In some implementations, the gNB configures N first type CSI-RS groups each of which includes one or more resources. Each of N first type CSI-RS resource groups corresponds to one of the N CSI-RS port groups, such as one TRP of N TRPs as shown in FIG. 4. gNB can further configure X second type CSI-RS resource groups. The X second type of CSI-RS resource groups can include the same or different number of CSI-RS resources. If one second type of CSI-RS resource group includes more than one CSI-RS resource, different CSI-RS resources in one second type of group RS are from different first type of CSI-RS resource groups. For example, one second type of CSI-RS resource group includes 4 CSI-RS resources that are from the 4 first type CSI-RS resource groups respectively. If one second type CSI-RS resource group includes 2 CSI-RS resources which are from the 2 first type CSI-RS resource groups respectively. The N first type CSI-RS resource groups are in one CSI-RS resource group. In another implementation, the N first type CSI-RS resource groups are in N CSI-RS resource sets each of which includes one of the N first type CSI-RS resource groups. The UE reports Y CRI, each of the Y CRI corresponds to one second CSI-RS port group or corresponds to one CSI-RS resource in the first type of CSI-RS resource group and is not included in any second type CSI-RS resource. There are X+Z CRIs, the first X CRIs correspond to X second type CSI-RS resource groups and the Z CRI correspond to Z CSI-RS resources each of which is included in one first type CSI-RS resource group and is not included in any of the X second type CSI-RS resources. The reported Y CRIs are from the X+Z CRIs. In another implementation, the reported Y CRI includes Y1 CRIs and Y2 CRI, wherein Y equals Y1 and Y2, Y1 and Y2 are a fixed value or an agreed value. The reported Y1 CRI is from the X CRIs each of which corresponds to one second type CSI-RS resource group. The reported Y2 CRI is from the Z CRIs each of which corresponds to one CSI-RS resource, which is in one first type CSI-RS resource group and is not included in any of the X second type CSI-RS group.

In some implementations, the gNB configures CSI parameter of each CSI-RS resource in one second type CSI-RS resource groups. The CSI parameter includes at least one of the number of third type vectors (e.g., $L_j$), the number of third type vectors (e.g., $M_j$), the number of none-zero values in a bitmap.

In some implementations, the gNB configures CSI parameter for one second type CSI-RS port group.

In some implementations, the report period for reporting parameters of TRP-common is shorter than the report period for reporting parameters of TRP-specific.

For example, the set of third type of vectors and the set of second type of vectors are reported at every second period, but at least one of $$p_{i,q,j}^{(1)}, p_{i,j}^{(3)}, \varphi_{i,j}^{(3)}, \varphi_{j}^{(4)}$$

is reported at every first period. The second period includes more than one first period. The reported $$p_{i,q,j}^{(1)}, p_{i,j}^{(3)}, \varphi_{i,j}^{(3)}, \varphi_{j}^{(4)}$$

in multiple first periods are based on the latest reported set of third type of vectors and the set of second type of vectors.

In some implementations, the gNB configures the mapping relationship between CSI-RS ports and $v$ layers.

In some implementations, the gNB configures N CSI-RS ports corresponding to one layer, wherein N is larger than 1.

For example, the N CSI-RS ports correspond to the same column of a precoding matrix, such as $$W_{t_1}^l,$$

as shown in formula (1). Each of the N CSI-RS ports corresponding to the same layer is from one CSI-RS port group. Then, as shown in formulas (4)-(15) one $L_j = v$, $v_{i,j}$ is a vector with only one element that equals 1 and the remaining $$\frac{P_j}{2} - 1$$

elements are 0, the UE does not need to report the index of $v_{i,j}$ which is configured by gNB. In addition, for each layer, $L_j$ equals 1, the $v_{i,j}$ in any of formulas (4)-(15) can be replaced with $v_{i,j}$.

In another implementation, the gNB selects $E_j$ CSI-RS ports from CSI-RS ports of CSI-RS port group j for each layer, wherein $E_j$ is larger than or equal to $v$. $E_j$ is smaller than $P_j$, wherein $P_j$ is the number of CSI-RS ports in CSI-RS port group j. The UE reports the index of $v_{i,j}$ from the $E_j$ ports instead of from $P_j$ ports. In some implementations, the $E_j$ is configured for each rank $v$ and each j, that is $E_{j,v}$.

Using the above methods, it is possible to reduce the complexity of UE because the UE does not need to search N CSI-RS ports for each layer in a larger range. For example, if each of the N CSI-RS port groups includes 8 CSI-RS ports and the gNB does not configure a mapping relationship between CSI-RS port and layer (or mapping relationship between rank and CSI-RS ports), the UE needs to search 8*8*8*8 combination to report a precoding matrix as shown in any of formulas (4)-(15) for one layer such as the first layer, wherein each combination includes one CSI-RS port from each of N CSI-RS port groups. If each combination includes more than one CSI-RS port from each of the N CSI-RS port groups, it can be more difficult for UE to get a precoding matrix for each layer as shown in formulas (4)-(5).

Each of CSI-RS port groups corresponds to one CSI-RS resource. In another implementation, the N CSI-RS port groups are in one CSI-RS resource.

For example, the precoding matrix is obtained according to the following procedure:

Step 1: the gNB obtains optional PMI for each TRP respectively which can be based on UE feedback or SRS while CJT is not considered;

Step 2: the gNB transmits CSI-RS ports after precoding;

Step 3: the UE sends feedback corresponding to CJT codebook or Rel-16/R-17 codebook based on CSI-RS ports after precoding.

In performing the operations above in Step 1-Step 3, two schemes can be used.

For Step 1 in the first scheme, if the gNB obtains precoding based on SRS, the precoding may have considered CJT transmission scheme.

For Step 1, the UE/gNB obtains a $W_j$ which is just based on $H_j$, which is a channel between TRP j and UE. CJT is not considered. $W_j$ is based on SVD of $H_j$. Each column of $W_j$ corresponds to one spatial domain vector instead of the combination of a spatial domain vector and a frequency domain vector.

For Step 2 in the first scheme, each TRP transmits two precoding ports for each layer, and two ports correspond to two polarization directions.

For example, each TRP with T antenna will transmit two $$W_j = \begin{bmatrix} W_{j,0} \\ W_{j,1} \end{bmatrix} \Rightarrow \begin{bmatrix} W_{j,0} P_{j,0} \\ W_{j,1} P_{j,1} \end{bmatrix}$$

for each layer. For each layer, the T antenna ports is transformed to two ports. Then each TRP transmits $v*2$ ports. Of course, the gNB can transmits more than $v*2$ ports.

$$H_e = \begin{bmatrix} H_1 & H_2 & H_3 & H_4 \end{bmatrix} \begin{bmatrix} W_1 \\ W_2 \\ W_3 \\ W_4 \end{bmatrix}$$

For Step 3 in the first scheme, the UE obtains $H_e$ that includes R rows and $2*N*v$ columns, wherein N is the number of TRPs. Then each TRP will transmits $2*v$. The UE obtains SVD of $H_e$, and feedback CJT with each TRP with $2*v$ ports or more ports.

If different TRPs correspond to independent frequency domain vector sets, then a new port selection based CJT can be used. If different TRPs correspond to the same frequency domain vector sets, Re-16 port selection based codebook can be directly reused, but the first P/2 ports is the first polarization and the second P/2 ports is the second polarization in Rel-16 codebook structure.

$$W^l_{q_1, q_2, n_1, n_2, n_3, l, p_l^{(1)}, p_l^{(2)}, i_{2,5,l,l}} =$$

$$\frac{1}{\sqrt{N_1 N_2 \gamma_{t,l}}} \begin{bmatrix} \sum_{i=0}^{L-1} v_{m_1^{(i)}, m_2^{(i)}} p_{i,0}^{(1)} \sum_{f=0}^{M_v-1} y_{t,l}^{(f)} p_{l,i,f}^{(2)} \varphi_{l,i,f} \\ \sum_{i=0}^{L-1} v_{m_1^{(i)}, m_2^{(i)}} p_{i,1}^{(1)} \sum_{f=0}^{M_v-1} y_{t,l}^{(f)} p_{l,i+L,f}^{(2)} \varphi_{l,i+L,f} \end{bmatrix},$$

$$l = 1, 2, 3, 4,$$

In this way, the port arrangement can be enhanced.

$$\begin{bmatrix} p_{0,0} \\ p_{0,1} \\ p_{0,2} \\ p_{0,3} \\ p_{1,0} \\ p_{1,1} \\ p_{1,2} \\ p_{1,3} \end{bmatrix}$$

wherein $P_{q,j}$ is CSI-RS ports of TRP j of polarization q. For each polarization, each TRP can transmit more than one precoding port.

In the above Step 3, the UE selects ports for each layer. In another implementation the gNB configures CSI-RS ports for each layer, then the UE can obtain co-amplitude and phase between TRP for each layer and does not need to select ports for each layer. Especially, the gNB performs (or obtains) precoding based on SRS and this precoding has considered CJT in Step 1.

The gNB configures a relationship between precoding CSI-RS ports and layers. For example, each TRP transmits $2*v$ CSI-RS ports. If gNB does not configure the relationship, the UE needs to select at least one port from $v$ CSI-RS ports, increasing the complexity of the UE. Of course, if the precoding of Step 1 is selected without considering CJT, the selection of UE is necessary.

The three Steps in the second scheme can include the following procedures:

In Step 1 in the second scheme, the UE/gNB obtains a $W_j$ which is just based on $H_j$, which is a channel between TRP j and UE. CJT is not considered. $W_j$ is based on SVD $H_j$. Each column of $W_j$ corresponds to one spatial domain vector instead of the combination of a spatial domain vector and a frequency domain vector.

In Step 3 in the second scheme, if different TRPs correspond to independent frequency domain vector sets, then a new port selection based CJT can be used and each TRP corresponds to a Rel-17 codebook. If different TRPs correspond to the same frequency domain vector sets, Re-17 port selection based codebook can be directly reused, but the first P/2 ports is the first polarization and the second P/2 ports is the second polarization in Rel-17 codebook structure.

If N is larger than 1, the $L_j$ can be configured with value 1 for CSI-RS port group j. In some implementations, $$\sum_{j=0}^{N-1} L_j$$

should be larger than 1.

If N is larger than 1, the $M_j$ can be configured with value 1 for CSI-RS port group j. In some implementations $$\sum_{j=0}^{N-1} M_j$$

should be larger than 1.

In some implementations, the range of codebook parameters for N equaling 1 case and for N larger than 1 are different. Even for one CSI-RS port group, the range of codebook parameters for each CSI-RS port in the case N equaling 1 case and in the case N larger than 1 are different.

In above implementation, the PMI is reported by the UE according to a measurement result of N CSI-RS port groups for getting downlink transmitting precoding matrix. Similarly, the gNB can inform UE with the transmit precoding matrix index (TPMI) using the above precoding matrix report method. For example, the TPMI includes information about at least one of $$\varphi_j^{(4)} p_{i,q,j}^{(1)}, \ p_{i,i,f,j}^{(2)}, \ \varphi_{i,i,f,j}^{(2)}, \ p_{i,j}^{(3)}, \ \varphi_{i,j}^{(3)} y_{i,j}^{(1)}, \ y_{i,f,j}^{(2)} \text{ or } v_{i,j}.$$

In some implementations, the total number of CSI-RS ports of the N CSI-RS port groups should not be larger than a fifth threshold.

The time domain restriction about multiple CSI-RS resources.

Example 2

The disclosed technology can be implemented in some embodiments to provide more Schemes about multiple panels.

In some embodiments of the disclosed technology, the codebook includes a first type of vector and a second type of vector, wherein one element of the first type of vector corresponds to one first type of frequency domain unit and one element of the second type of vector corresponds to one second type of frequency domain unit In some embodiments of the disclosed technology, the relationship between the first type of frequency domain vector and the second type of frequency domain vector In some embodiments of the disclosed technology, the size of the first frequency domain vector depends on at least one of N, bandwidth of BWP, sub-carrier space, or a length of a cyclic prefix.

In some embodiments of the disclosed technology, for a CJT codebook, the first information is reported in a first period and the second information is reported in a second period FIG. 5 shows an example of a process for wireless communication based on some example embodiments of the disclosed technology.

In some embodiments of the disclosed technology, a wireless communication method 500 includes, at 510, determining, by a communication device, N channel status information reference signal port groups, wherein N is a positive integer, at 520, receiving, by the communication device, channel status information reference signals on the N channel status information reference signal port groups, and, at 530, determining, by the communication device, C precoding matrices based on the received channel status information reference signals on the N channel status information reference signal port groups, wherein C is a positive integer, and at 540, transmitting, by the communication device, a report including a precoding matrix indicator that includes information about a first type of vector, wherein the first type of vector includes C elements, and each of the C elements corresponds to one first type of frequency domain unit, wherein each of the C precoding matrices corresponds to one first type of frequency domain unit and includes N sub-precoding matrices each of which corresponds to one of the N channel status information reference signal port groups. In another implementation, the communication device (e.g., UE) obtains the N sub precoding matrices based on the N CSI-RS port groups and the N sub-precoding matrices corresponding to the same one or more layers.

In some implementations, the precoding matrix indicator includes PMI discussed above.

In some implementations, C is $F_4$, and D is $F_3$ discussed above.

FIG. 6 shows an example of a process for wireless communication based on some example embodiments of the disclosed technology.

In some embodiments of the disclosed technology, a wireless communication method 600 includes, at 610, transmitting, by a communication node, channel status information reference signals on N channel status information reference signal port groups, wherein N is a positive integer, at 620, receiving, by the communication node, from a communication device, a report including a precoding matrix indicator that includes information about a first type of vector, wherein the first type of vector includes C elements, and each of the C elements corresponds to one first type of frequency domain unit, wherein C is a positive integer, and at 630, determining, by the communication node, C precoding matrices based on the received report, wherein each of the C precoding matrices corresponds to one first type of frequency domain unit and includes N sub-precoding matrices each of which corresponds to one of the N channel status information reference signal port groups. In another implementation, the communication device (e.g., UE) obtains the N sub precoding matrices based on the N CSI-RS port groups and the N sub-precoding matrices corresponding to the same one or more layers.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of communication, comprising: determining, by a communication device, N channel status information reference signal port groups, wherein N is a positive integer; receiving, by the communication device, channel status information reference signals on the N channel status information reference signal port groups; determining, by the communication device, C precoding matrices based on the received channel status information reference signals on the N channel status information reference signal port groups, wherein C is a positive integer; and transmitting, by the communication device, a report including a precoding matrix indicator that includes information about a first type of vector, wherein the first type of vector includes C elements, and each of the C elements corresponds to one first type of frequency domain unit, wherein each of the C precoding matrices corresponds to one first type of frequency domain unit and includes N sub-precoding matrices each of which corresponds to one of the N channel status information reference signal port groups.

In another implementation, the communication device just gets the N sub-precoding matrices based on the N CSI-RS port groups and the N sub-precoding matrices corresponding to the same one or more layers.

Clause 2. The method of clause 1, wherein the precoding matrix indicator further includes information about a second type of vector, wherein the second type of vector includes D elements, and each of the D elements corresponds to a second type of frequency domain unit, wherein D is a positive integer.

Clause 3. The method of clause 1, wherein, for each of the N channel status information reference signal port groups, C sub-precoding matrices are determined according to one or more sets of the first type of vectors, wherein each of the C sub-precoding matrices is associated with one of the C precoding matrices.

Clause 4. The method of clause 3, wherein each of C sub-precoding matrices is determined by one element of each first type of vector in the one or more sets of the first type of vectors.

Clause 5. The method of clause 3, wherein, for each layer, C precoding vectors are determined according to one set of the first type of vectors, wherein each of the C precoding vectors is one column of one of the C sub-precoding matrices.

Clause 6. The method of clause 2, wherein, for each of the N channel status information reference signal port groups, C sub-precoding matrices are determined according to one or more first type of vectors and one or more sets of second type of vectors, wherein each of the C sub-precoding matrices is associated with one of the C precoding matrices.

Clause 7. The method of clause 6, wherein each of C sub-precoding matrices is determined by one element of each of the one or more first type of vectors and one element of each second type of vector in the one or more sets of the second type of vectors.

Clause 8. The method of clause 6, wherein, for each layer, C precoding vectors are determined according to one the first type of vector and one set of the second type of vectors, wherein each of the C precoding vectors is one column of one of the C sub-precoding matrices.

Clause 9. The method of clause 2, wherein each of the C precoding matrices includes V columns, each of the V columns being determined by one or more first elements and one or more second elements, wherein each first element respectively corresponds to one first type of vector and each second element respectively corresponds to one second type of vector, wherein V is a positive integer.

Clause 10. The method of clause 1, wherein each of the C precoding matrices includes V columns, wherein V is a positive integer, wherein each of the V columns includes N sub-sets of elements, wherein each of the N sub-sets of elements is determined by one set of the first type of vectors, wherein one set of the first type of vectors includes one or more of the first type of vectors, and wherein each of the N sub-sets of elements corresponds to one of the N channel status information reference signal port groups.

Clause 11. The method of clause 2, wherein each of the C precoding matrices includes V columns, wherein V is a positive integer, wherein each of the V columns includes N sub-sets of elements, wherein each of the N sub-sets of elements is determined by one first type of vector and one set of the second type of vectors, wherein one set of the second type of vectors includes one or more of the first type of vectors, and wherein each of N sub-sets of elements corresponds to one of the N channel status information reference signal port groups.

Clause 12. The method of any of clauses 1-11, wherein one element with index $t_1$ of the first type of vector includes $$y^{(1)}_{t_1,l,j}$$

expressed by $$y^{(1)}_{t_1,l,j} = e^{j\frac{2\pi n_{4,l,j} t_1}{F_4}},$$

$n_{4,l,j} \in \{0, 1, \ldots, F_4-1\}$, $t_1=0, 1 \ldots, F_4-1$ or n $$y^{(1)}_{t_1} = \exp^{\frac{j2\pi n_4 t_1}{F_4}},$$

$n_4 \in \{0, 1, \ldots F_4-1\}$, $t_1=0, 1 \ldots, F_4$, wherein $F_4$ is the number of first type of frequency domain units and/or $F_4$ equal to C.

Clause 13. The method of any of clauses 2-12, wherein one element with index $t_2$ of the second type of vector includes $$y^{(2)}_{t_2,l,j}$$

expressed by one of:

$$y^{(2)}_{t_2} = e^{j\frac{2\pi n_3^f t_2}{F_3}}, n_3^f \in \{0,1, \ldots F_3-1\},$$

$$t_2 = 0,1, \ldots F_3-1, f = 0,1, \ldots M_j - 1;$$

$$y^{(2)}_{t_2} = e^{j\frac{2\pi(n_3^f * R_1)t_2}{F_3 * R_1}}, n_3^f \in \{0,1, \ldots F_3-1\},$$

$$t_2 = 0,1, \ldots F_3-1, f = 0,1, \ldots M_j - 1; or$$

$$y^{(2)}_{t_2} = e^{j\frac{2\pi(n_3^f * R_1)t_2}{F_4}}, n_3^f \in \{0,1, \ldots F_3-1\},$$

$$t_2 = 0,1, \ldots F_3-1, f = 0,1, \ldots M_j - 1,$$

wherein M is the number of second type of vectors, $F_4$ is the number of the first type of frequency domain units and/or $F_4$ equals C, $F_3$ is the number of the second type of frequency domain units and/or $F_3$ equals D, wherein $F_4 \geq F_3$ or $F_4$ is a multiple of $F_3$.

Clause 14. The method of clause 1, wherein the precoding matrix indicator includes information about one of: one set of first type of vectors for each of the N channel status information reference signal port groups of each layer; one set of first type of vectors for each layer; or one set of first type of vectors for each set of channel status information reference signal port groups of each layer, wherein each set of channel status information reference signal port groups includes one or more of the N channel status information reference signal port groups.

Clause 15. The method of clause 14, wherein the precoding matrix indicator includes an index of the first type of vector without remapping operation.

Clause 16. The method of clause 15. wherein the precoding matrix indicator includes an index of the second type of vectors after remapping operation.

Clause 17. The method of clause 2, wherein the precoding matrix indicator includes information about one of: one first type of vector and one set of the second type of vectors for each or N−1 of the N channel status information reference signal port groups of each layer; one first type of vector and one set of the second type of vectors for each layer; or one first type of vector and one set of the second type of vectors for each layer of one set of channel status information reference signal groups, wherein each set of channel status information reference signal groups includes one or more of the N channel status information reference signal port groups.

Clause 18. The method of clause 2, wherein a condition is satisfied, wherein the condition include at least one of: each second type of frequency domain unit includes one or more first type of frequency domain units; each first type of frequency domain unit is in only one second type of frequency domain unit; C is equal to or larger than D; the number of the first type of frequency domain units in a second type of frequency domain unit is based on N; C is a multiple of D, or $C=(D-2)*R_1+R_3+R_4$, wherein $R_1$ is the number of first frequency domain units in each of D−2 of the D second frequency domain units, $R_3$ is the number of first frequency domain units in the first of the D second frequency domain units, $R_4$ is the number of first frequency domain units in the last of the D second frequency domain units, and $R_3$ and $R_4$ are smaller than or equal to $R_1$.

Clause 19. The method of any of clauses 2-18, wherein: the precoding matrix includes an index of a first frequency domain after remapping with regard to a reference first type of frequency domain vector, and the precoding matrix includes an index of a second frequency domain after remapping with regard to a reference second type of frequency domain vector; or the precoding matrix includes an index of the first frequency domain without remapping, and the precoding matrix includes an index of the second frequency domain after remapping with regard to the reference second type of frequency domain vector.

Clause 20. The method of clause 12, wherein the precoding matrix indicator includes $n_4$ or $n_{4,l,j}$ reported by $\lceil \log_2 F_4 \rceil$ bits.

Clause 21. The method of clause 13, wherein the precoding matrix indicator includes $M_j-1$ of $$n_{3,l,j}^f$$

for one CSI-RS port group j, where $$n_{3,l,j}^f$$

is after a remapping operation, wherein the remapping operation refers to at least one of:

$$n_{3,l,j}^f = \left(n_{3,l,j}^f - n_{3,l,j}^{f*}\right) \bmod F_3; \ n_{3,l,j}^f = \left(n_{3,l,j}^f - n_{3,l,j}^0\right);$$

$$\text{or } n_{3,l,j}^f = \left(\left(n_{3,l,j}^f - n_{3,l,j_1^*}^{f_1^*}\right) * R_1\right) \bmod F_4.$$

Clause 22. The method of clause 21, wherein, in a case that the remapping operation corresponds $$n_{3,l,j}^f = \left(n_{3,l,j}^f - n_{3,l,j}^0\right),$$

the communication device reports $f*_{l,j}$ for each layer of each j.

Clause 23. The method of any of clauses 1-22, wherein the report includes $\lceil \log_2 R_1 \rceil$ bits corresponding to one first type of vector, wherein $R_1$ is the number of the first type of frequency units in one second type of frequency domain unit.

Clause 24. The method of clause 13, wherein $n_{4,l,j}$ equals $$R_1 n_{3,l,j}^0 + x; \text{ or } R_1 n_{3,l,j}^{f_{l,j}^*} + x.$$

Clause 25. The method of clause 13, wherein, for each j, $M_j$ indices of $$n_{3,l,j}^f$$

increase while $f$ increases.

Clause 26. The method of any of clauses 13-14, wherein the report includes $n_{4,l,j}$ and $$n_{3,l,j}^f$$

in one of an independent bit field, or a same bit field.

Clause 27. The method of any of clauses 1 to 26, wherein a column with index 1 of a sub matrix with index j of one precoding matrix with index $t_1$ includes one of a plurality of formats, including:

$$w_{t_1,j}^j = \begin{bmatrix} w_{t_1,0,j}^j \\ w_{t_1,1,j}^j \end{bmatrix} =$$

$$\frac{1}{\beta_{l,j}} \begin{bmatrix} \sum_{i=0}^{L_j-1} v_{i,j} p_{l,0,j}^{(1)} p_{l,j}^{(3)} \phi_{l,j}^{(3)} y_{t_1,l,j}^{(1)} \sum_{f=0}^{M_j-1} y_{t_2,l,f,j}^{(2)} p_{l,i,f,j}^{(2)} \phi_{l,i,f,j}^{(2)} \\ \sum_{i=0}^{L_j-1} v_{i,j} p_{l,1,j}^{(1)} p_{l,j}^{(3)} \phi_{l,j}^{(3)} y_{t_1,l,j}^{(1)} \sum_{f=0}^{M_j-1} y_{t_2,l,f,j}^{(2)} p_{l,i+L,f,j}^{(2)} \phi_{l,i+L,f,j}^{(2)} \end{bmatrix};$$

$$w_{t_1,j}^j = \begin{bmatrix} w_{t_1,0,j}^j \\ w_{t_1,1,j}^j \end{bmatrix} =$$

$$\frac{1}{\beta_{l,j}} \begin{bmatrix} \sum_{i=0}^{L_j-1} v_{i,j} p_{l,0,j}^{(1)} p_{l,j}^{(3)} \phi_{l,j}^{(3)} \phi_j^{(4)} y_{t_1,l,j}^{(1)} \sum_{f=0}^{M_j-1} y_{t_2,l,f,j}^{(2)} p_{l,i,f,j}^{(2)} \phi_{l,i,f,j}^{(2)} \\ \sum_{i=0}^{L_j-1} v_{i,j} p_{l,1,j}^{(1)} p_{l,j}^{(3)} \phi_{l,j}^{(3)} \phi_j^{(4)} y_{t_1,l,j}^{(1)} \sum_{f=0}^{M_j-1} y_{t_2,l,f,j}^{(2)} p_{l,i+L,f,j}^{(2)} \phi_{l,i+L,f,j}^{(2)} \end{bmatrix};$$

$$w_{t_1,j}^j = \begin{bmatrix} w_{t_1,0,j}^j \\ w_{t_1,1,j}^j \end{bmatrix} =$$

$$\frac{1}{\beta_{l,j}} \begin{bmatrix} \sum_{i=0}^{L_j-1} v_{i,j} p_{l,0,j}^{(1)} p_{l,j}^{(3)} \phi_j^{(4)} y_{t_1,l,j}^{(1)} \sum_{f=0}^{M_j-1} y_{t_2,l,f,j}^{(2)} p_{l,i,f,j}^{(2)} \phi_{l,i,f,j}^{(2)} \\ \sum_{i=0}^{L_j-1} v_{i,j} p_{l,1,j}^{(1)} p_{l,j}^{(3)} \phi_j^{(4)} y_{t_1,l,j}^{(1)} \sum_{f=0}^{M_j-1} y_{t_2,l,f,j}^{(2)} p_{l,i+L,f,j}^{(2)} \phi_{l,i+L,f,j}^{(2)} \end{bmatrix};$$

$$w_{t_1,j}^j = \begin{bmatrix} w_{t_1,0,j}^j \\ w_{t_1,1,j}^j \end{bmatrix} =$$

-continued $$\frac{1}{\beta_{l,j}}\left[\begin{array}{c}\sum_{i=0}^{L_j-1}v_{i,j}p_{l,0,j}^{(1)}y_{t_1,l,j}^{(1)}\sum_{f=0}^{M_j-1}y_{t_2,l,f,j}^{(2)}p_{l,i,f,j}^{(2)}\phi_{l,i,f,j}^{(2)}\\ \sum_{i=0}^{L_j-1}v_{i,j}p_{l,1,j}^{(1)}y_{t_1,l,j}^{(1)}\sum_{f=0}^{M_j-1}y_{t_2,l,f,j}^{(2)}p_{l,i+L,f,j}^{(2)}\phi_{l,i+L,f,j}^{(2)}\end{array}\right];$$

$$w_{t_1,j}^l=\left[\begin{array}{c}w_{t_1,0,j}^l\\ w_{t_1,1,j}^l\end{array}\right]=$$

$$\frac{1}{\beta_{l,j}}\left[\begin{array}{c}\sum_{i=0}^{L_j-1}v_{i,j}p_{l,0,j}^{(1)}\phi_j^{(4)}y_{t_1,l,j}^{(1)}\sum_{f=0}^{M_j-1}y_{t_2,l,f,j}^{(2)}p_{l,i,f,j}^{(2)}\phi_{l,i,f,j}^{(2)}\\ \sum_{i=0}^{L_j-1}v_{i,j}p_{l,1,j}^{(1)}\phi_j^{(4)}y_{t_1,l,j}^{(1)}\sum_{f=0}^{M_j-1}y_{t_2,l,f,j}^{(2)}p_{l,i+L,f,j}^{(2)}\phi_{l,i+L,f,j}^{(2)}\end{array}\right];$$

$$w_{t_1,j}^l=\left[\begin{array}{c}w_{t_1,0,j}^l\\ w_{t_1,1,j}^l\end{array}\right]=$$

$$\frac{1}{\beta_{l,j}}\left[\begin{array}{c}\sum_{i=0}^{L_j-1}v_{i,j}p_{l,0,j}^{(1)}p_{l,j}^{(3)}\phi_{l,j}^{(3)}\sum_{f=0}^{M_j-1}y_{t_1,l,f,j}^{(1)}p_{l,i,f,j}^{(2)}\phi_{l,i,f,j}^{(2)}\\ \sum_{i=0}^{L_j-1}v_{i,j}p_{l,1,j}^{(1)}p_{l,j}^{(3)}\phi_{l,j}^{(3)}\sum_{f=0}^{M_j-1}y_{t_1,l,f,j}^{(1)}p_{l,i+L,f,j}^{(2)}\phi_{l,i+L,f,j}^{(2)}\end{array}\right];$$

$$w_{t_1,j}^l=\left[\begin{array}{c}w_{t_1,0,j}^l\\ w_{t_1,1,j}^l\end{array}\right]=$$

$$\frac{1}{\beta_{l,j}}\left[\begin{array}{c}\sum_{i=0}^{L_j-1}v_{i,j}p_{l,0,j}^{(1)}p_{l,j}^{(3)}\phi_{l,j}^{(3)}\phi_j^{(4)}\sum_{f=0}^{M_j-1}y_{t_1,l,f,j}^{(1)}p_{l,i,f,j}^{(2)}\phi_{l,i,f,j}^{(2)}\\ \sum_{i=0}^{L_j-1}v_{i,j}p_{l,1,j}^{(1)}p_{l,j}^{(3)}\phi_{l,j}^{(3)}\phi_j^{(4)}\sum_{f=0}^{M_j-1}y_{t_1,l,f,j}^{(1)}p_{l,i+L,f,j}^{(2)}\phi_{l,i+L,f,j}^{(2)}\end{array}\right];$$

$$w_{t_1,j}^l=\left[\begin{array}{c}w_{t_1,0,j}^l\\ w_{t_1,1,j}^l\end{array}\right]=$$

$$\frac{1}{\beta_{l,j}}\left[\begin{array}{c}\sum_{i=0}^{L_j-1}v_{i,j}p_{l,0,j}^{(1)}p_{l,j}^{(3)}\sum_{f=0}^{M_j-1}y_{t_1,l,f,j}^{(1)}p_{l,i,f,j}^{(2)}\phi_{l,i,f,j}^{(2)}\\ \sum_{i=0}^{L_j-1}v_{i,j}p_{l,1,j}^{(1)}p_{l,j}^{(3)}\sum_{f=0}^{M_j-1}y_{t_1,l,f,j}^{(1)}p_{l,i+L,f,j}^{(2)}\phi_{l,i+L,f,j}^{(2)}\end{array}\right];$$

$$w_{t_1,j}^l=\left[\begin{array}{c}w_{t_1,0,j}^l\\ w_{t_1,1,j}^l\end{array}\right]=$$

$$\frac{1}{\beta_{l,j}}\left[\begin{array}{c}\sum_{i=0}^{L_j-1}v_{i,j}p_{l,0,j}^{(1)}p_{l,j}^{(3)}\phi_j^{(4)}\sum_{f=0}^{M_j-1}y_{t_1,l,f,j}^{(1)}p_{l,i,f,j}^{(2)}\phi_{l,i,f,j}^{(2)}\\ \sum_{i=0}^{L_j-1}v_{i,j}p_{l,1,j}^{(1)}p_{l,j}^{(3)}\phi_j^{(4)}\sum_{f=0}^{M_j-1}y_{t_1,l,f,j}^{(1)}p_{l,i+L,f,j}^{(2)}\phi_{l,i+L,f,j}^{(2)}\end{array}\right];$$

$$w_{t_1,j}^l=\left[\begin{array}{c}w_{t_1,0,j}^l\\ w_{t_1,1,j}^l\end{array}\right]=\frac{1}{\beta_{l,j}}\left[\begin{array}{c}\sum_{i=0}^{L_j-1}v_{i,j}p_{l,0,j}^{(1)}\sum_{f=0}^{M_j-1}y_{t_1,l,f,j}^{(1)}p_{l,i,f,j}^{(2)}\phi_{l,i,f,j}^{(2)}\\ \sum_{i=0}^{L_j-1}v_{i,j}p_{l,1,j}^{(1)}\sum_{f=0}^{M_j-1}y_{t_1,l,f,j}^{(1)}p_{l,i+L,f,j}^{(2)}\phi_{l,i+L,f,j}^{(2)}\end{array}\right];$$

and $$w_{t_1,j}^l=\left[\begin{array}{c}w_{t_1,0,j}^l\\ w_{t_1,1,j}^l\end{array}\right]=$$

$$\frac{1}{\beta_{l,j}}\left[\begin{array}{c}\sum_{i=0}^{L_j-1}v_{i,j}p_{l,0,j}^{(1)}\phi_j^{(4)}\sum_{f=0}^{M_j-1}y_{t_1,l,f,j}^{(1)}p_{l,i,f,j}^{(2)}\phi_{l,i,f,j}^{(2)}\\ \sum_{i=0}^{L_j-1}v_{i,j}p_{l,1,j}^{(1)}\phi_j^{(4)}\sum_{f=0}^{M_j-1}y_{t_1,l,f,j}^{(1)}p_{l,i+L,f,j}^{(2)}\phi_{l,i+L,f,j}^{(2)}\end{array}\right],$$

wherein $$y_{t_1,l,f,j}^{(1)}$$

is an element of a first type of vector specific to layer l, first type of vector index $f$ and CSI-RS port index $$j \cdot y_{t_1,l,j}^{(1)}$$

is an element of a first type of vector specific to layer l, and CSI-RS port index j.

Clause 28. The method of clause 27, wherein the precoding matrix indicator includes an index including $i^*_{l,j}$ or index $i^*_{i,j}$ and index $f^*_{l,j}$ corresponding to a strongest value among amplitudes $$P_{l,i,f,j}^{(2)},$$

for each layer l of each CSI-RS port group j.

Clause 29. The method of clause 27, wherein the precoding matrix indicator includes $j^*_l$ corresponding to a maximum value of $$p_{l,j}^{(3)}$$

for each layer l, wherein $l \in \{1, 2, \ldots v\}$.

Clause 30. The method of clause 27, wherein the precoding matrix indicator includes $i^*_l$, $f^*_l$, $j^*_l$ corresponding to a maximum value among amplitudes $$p_{l,i,f,j}^{(2)},$$

for each layer l.

Clause 31. The method of clause 27, wherein the precoding matrix indicator includes $$N-1 \text{ of } \phi_j^{(4)}$$

without reporting $$\phi_0^{(4)} = 1.$$

Clause 32. The method of clause 1, wherein: a first period for reporting first information of the precoding matrix is the same as a second period for reporting second information of the precoding matrix including at least one of $$v_{i,j}, \ y_{l,j}^{(1)}, \ y_{l,f,j}^{(2)}, \ p_{l,q,j}^{(1)}, \ p_{l,i,f,j}^{(2)}, \ \phi_{l,i,f,j}^{(2)}, \ p_{l,j}^{(3)}, \text{ or } \phi_{l,j}^{(3)};$$

or the first period for reporting the first information is different from the second period for reporting the second information.

Clause 33. The method of any of clauses 27 and 32, wherein: the first information includes at least one of $$p_{l,q,j}^{(1)}, \ p_{l,i,f,j}^{(2)}, \ \varphi_{l,i,f,j}^{(2)(3)}, \ p_{l,j}^{(3)}, \ \varphi_{l,j}^{(3)}, \text{ or } \phi_j^{(4)};$$

and/or the second information includes at least one of $$y_{l,j}^{(1)}, \ y_{l,f,j}^{(2)}p_{l,q,j}^{(1)}, \ p_{l,i,f,j}^{(2)}, \ \varphi_{l,i,f,j}^{(2)}, \ p_{l,j}^{(3)}, \ \varphi_{l,j}^{(3)} \text{ or } v_{i,j}.$$

Clause 34. The method of clause 27, wherein the precoding matrix indicator includes multiple sets of

41

$$\phi_j^{(4)}$$

reported in a given time, wherein each set of $$\phi_j^{(4)}$$

corresponds one of a plurality of occasions of the N CSI-RS port groups.

Clause 35. The method of clause 27, wherein $$\phi_{j,t}^{(4)} = \sum_{z=0}^{Z_j-1} p_j^{(4)} e^{\frac{j*2*\pi n_{5,j}^z t}{T}},$$

$$n_{5,j}^z \in \{0, 1, \dots, T-1\}, t = 0, 1, \dots, T-1,$$

wherein $$\phi_{j,t}^{(4)} \text{ is } \phi_j^{(4)}$$

corresponding to a time domain unit and the precoding matrix indicator includes information about $$n_{5,j}^z.$$

Clause 36. The method of any of clauses 2-35, wherein each of the C precoding matrices includes N sub-precoding matrices, a size of the second type of frequency domain unit is respectively determined for each of N sub-precoding matrices.

Clause 37. The method of clause 1, wherein the communication device determines one or more channel quality indicators (CQIs) based on one or more of the C precoding matrices, wherein different CQIs correspond to different sets of layers and different codewords.

Clause 38. The method of clause 27, wherein the precoding matrix indicator includes one of: one bitmap for each CSI port group of each layer to indicate the non-zero values of $$p_{l,i,f,j}^{(2)}$$

and $$\phi_{l,i,f,j}^{(2)}$$

of each CSI port group of the corresponding layer; or one bitmap for each layer to indicate the non-zero values of $$p_{l,i,f,j}^{(2)}$$

42 and $$\phi_{l,i,f,j}^{(2)}$$

of the corresponding layer.

Clause 39. The method of clause 38, wherein a condition is satisfied, wherein the condition includes at least one of: a total number of value 1 in one bitmap is not larger than a first threshold; a total number of value 1 in multiple bitmaps corresponding to a same channel status information reference signal port group index and multiple layers is not larger than a second threshold; a total number of value 1 in multiple bitmaps corresponding to multiple channel status information reference signal port group indices and one layer is not larger than a third threshold; or a total number of value 1 in multiple bitmaps corresponding to multiple channel status information reference signal port group indices and multiple layers is not larger than a fourth threshold.

Clause 40. The method of clause 39, wherein: the first threshold is different for different CSI-RS port groups; the second threshold is different for different CSI-RS port groups; and the third threshold is different for different layers.

Clause 41. The method of any of clauses 1-40, wherein the N sub-precoding matrices correspond to a same set of layers.

Clause 42. The method of any of clauses 1-40, wherein a condition is satisfied, wherein the condition includes at least one of: the N channel status information reference signal port groups are in one channel status information reference signal (CSI-RS) resource; each of the N channel status information reference signal port groups corresponds to one CSI-RS resource respectively; each of the N channel status information reference signal port groups corresponds to one transmission configuration indication (TCI) state respectively; or each of the N channel status information reference signal port groups corresponds to one or more CSI-RS resources, wherein the more CSI-RS resources are associated with a same TCI state or are quasi-co-located with a same channel parameter.

Clause 43. The method of clause 1, further comprising: receiving, by the communication device, a signaling that includes at least one of a first channel status information (CSI) parameter for each of the N channel status information reference signal port groups, a second CSI parameter shared by the N channel status information reference signal port groups.

Clause 44. The method of clause 43, wherein the first CSI parameter includes at least one of the number of the first type of vectors, the number of the second type of vectors, a codebook restriction, and the second CSI parameter includes a rank restriction.

Clause 45. The method of clause 1, further comprising at least one of: reporting, by the communication device, one or more CSI-RS resource indicators (CRIs) corresponding to the precoding matrix indicator; or reporting, by the communication device, multiple groups of CRIs and multiple precoding matrix indicators in a given time, wherein each of the multiple groups of CRIs corresponds to one of the multiple precoding matrix indicators.

Clause 46. The method of clause 45, wherein a condition is satisfied, wherein the condition includes at least one of: the multiple sets of CRIs include a first set and a second set corresponding to different numbers of CSI-RS resources; different numbers of CSI-RS resources correspond to different precoding matrix indicators; different CSI-RS resources in one group of CRIs corresponding to one of the multiple precoding matrix indicators are from different CSI-RS resource sets; or one CRI corresponds to one or more CSI-RS resources.

Clause 47. The method of clause 1, further comprising: receiving, by the communication device, a signaling that includes information about mapping between N channel status information reference signal ports and one layer, wherein different channel status information reference signal ports of the N channel status information reference signal ports are selected from different CSI-RS port groups.

Clause 48. The method of any of clauses 27-47, wherein a condition is satisfied, wherein the condition includes at least one of: the precoding matrix does not include the index of $v_{i,j}$ which is determined by the signaling for each layer; in a case that N is larger than 1, the $L_j$ is configured with value 1 or value larger than 1 for CSI-RS port group j; in a case that N is larger than $$\sum_{j=0}^{N-1} L_j$$

is larger than 1; or in a case that N is larger than 1, the $M_j$ is configured with value 1 or a value larger than 1 for CSI-RS port group j, wherein $$\sum_{j=0}^{N-1} M_j$$

is larger than 1.

Clause 49. The method of clause 43, wherein a condition is satisfied, wherein the condition includes at least one of: in a case that N is larger than 1, the number of a third type of vector is 1 or larger than 1 associated with one of the N CSI-RS port groups; in a case that N is larger than 1, the number of the first type of vectors is 1 or larger than 1 associated with one of the N CSI-RS port groups; or in a case that N is larger than 1, the number of the second type of vectors is 1 or larger than 1 associated with one of the N CSI-RS port groups.

Clause 50. A method of communication, comprising: transmitting, by a communication node, channel status information reference signals on N channel status information reference signal port groups, wherein N is a positive integer; receiving, by the communication node, from a communication device, a report including a precoding matrix indicator that includes information about a first type of vector, wherein the first type of vector includes C elements, and each of the C elements corresponds to one first type of frequency domain unit, wherein C is a positive integer; and determining, by the communication node, C precoding matrices based on the received report, wherein each of the C precoding matrices corresponds to one first type of frequency domain unit and includes N sub-precoding matrices each of which corresponds to one of the N channel status information reference signal port groups.

In some implementation, the communication node can also be a second communication device.

Clause 51. The method of clause 50, wherein the communication node includes N transmitter-receiver points each of which transmits one of the N channel status information reference signal port groups to communication device.

Clause 52. The method of clause 51, wherein the N transmitter-receiver points transmit the same layers of data channel or control channel based on C precoding matrices.

Clause 53. The method of any of clauses 1-52, wherein a size or a smallest size of the first type of frequency domain unit depends on at least one of N, a number of PRBs of bandwidth part (BWP), a sub-carrier space, a length of a cyclic prefix, a size of one subband, or a received signaling, wherein the received signaling includes information about the number of first type of frequency domain units in one subband, or information about the number of first type of frequency domain units in one second type of frequency domain unit.

Clause 54. The method of any of clauses 1-52, wherein the first type of frequency domain unit has a size that is equal to or smaller than a physical resource block (PRB), or the number of first type of frequency domain unit in one subband is larger than 2.

Clause 55. The method of any of clauses 1-52, wherein the size of the first type of frequency domain unit is determined based on $$\frac{1}{\Delta f * S} \leq CPlength,$$

wherein $\Delta f$ is a sub-carrier of the N CSI-RS port groups whose unit is Hz, S is the number of sub-carriers in one first type of frequency domain unit and CPlength is the length of a cyclic prefix.

Clause 56. The method of any of clauses 1-52, wherein the size of the first type of frequency domain unit is determined based $$S = \max\left(\left\lceil \frac{1}{CPlength * \Delta f} \right\rceil, \left\lfloor \frac{N_{PRB}^{SB} * 12}{R_2 * R_1} \right\rfloor\right),$$

wherein $$N_{PRB}^{SB}$$

is the number of PRBs in one subband, $R_2$ is the number of the second type of frequency domain units in one subband, $R_1$ is the number of the first type of frequency domain units in one second type of frequency domain unit, and S is the number of sub-carriers in one first type of frequency domain unit.

Clause 57. An apparatus for wireless communication comprising a processor that is configured to carry out the method of any of clauses 1 to 56.

Clause 58. A non-transitory computer readable medium having code stored thereon, the code when executed by a processor, causing the processor to implement a method recited in any of clauses 1 to 56.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

In the above implementation, a symbol index in a down subscript or in an up subscript of a vector or a matrix indicates that the vector or the matrix is specific to the index. For example, $n_{4,l,j}$ is specific to a layer 1 and CSI-RS port group j. The integer in a down subscript or in an up subscript of a vector or a matrix does not indicate that the vector or the matrix is specific to the integer and it indicates a category of the vector or matrix. For example, the subscript 4 of $n_{4,l,j}$ indicates a category of n.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of communication, comprising:

determining, by a communication device, N channel status information reference signal port groups, wherein N is a positive integer;

receiving, by the communication device, channel status information reference signals on the N channel status information reference signal port groups;

determining, by the communication device, C precoding matrices based on the received channel status information reference signals on the N channel status information reference signal port groups, wherein C is a positive integer; and transmitting, by the communication device, a report including a precoding matrix indicator that includes information about a first type of vector, wherein the first type of vector includes C elements, and each of the C elements corresponds to one first type of frequency domain unit, wherein each of the C precoding matrices corresponds to one first type of frequency domain unit and includes N sub-precoding matrices each of which corresponds to one of the N channel status information reference signal port groups, wherein the report further includes one or more CSI-RS resource indicators (CRIs) corresponding to the precoding matrix indicator, the N sub-precoding matrices correspond to a same set of layers, each of the N channel status information reference signal port groups corresponds to one CSI-RS resource respectively.

2. The method of claim 1, wherein the precoding matrix indicator further includes information about a second type of vector, wherein the second type of vector includes D elements, and each of the D elements corresponds to a second type of frequency domain unit, wherein D is a positive integer.

3. The method of claim 2, wherein, for each of the N channel status information reference signal port groups, C sub-precoding matrices are determined according to one vector of the first type of vectors and one or more sets of the second type of vectors, wherein each of the C sub-precoding matrices is associated with one of the C precoding matrices, and wherein each of C sub-precoding matrices is determined by one element of the one vector of the first type of vectors and one element of each vector of the second type of vectors in the one or more sets of the second type of vectors.

4. The method of claim 1, wherein one element with index $t_1$ of the first type of vector includes $$y_{t_1,l,j}^{(1)}$$

expressed by $$y_{t_1,l,j}^{(1)} = e^{j\frac{2\pi n_{4,l,j} t_1}{F_4}},$$

$n_{4,l,j} \in \{0, 1 \ldots, F_4-1\}$, $t_1=0, 1 \ldots, F_4-1$ or $$y_{t_1}^{(1)} = \exp^{\frac{j2\pi n_4 t_1}{F_4}},$$

$n_4 \in \{0, 1, \ldots F_4-1\}$, $t_1=0, 1 \ldots, F_4$, wherein $F_4$ is a number of first type of frequency domain units.

5. The method of claim 2, wherein one element with index $t_2$ of the second type of vector includes $$y_{t_2}^{(2)}$$

expressed by:

$$y_{t_2}^{(2)} = e^{j\frac{2\pi\left(n_3^f * R_1\right)t_2}{F_3 * R_1}},$$

$$n_3^f$$

$$\in \{0, 1, \ldots F_3-1\}, t_2=0, 1, \ldots F_3-1, f=0, 1, \ldots$$
$$M_j-1$$

wherein $M_j$ is a number of second type of vectors, $F_4$ is the number of the first type of frequency domain units and $F_4$ equals C, $F_3$ is the number of the second type of frequency domain units and $F_3$ equals D, wherein $F_4 \geq F_3$.

6. The method of claim 2, wherein:
the precoding matrix includes an index of the first frequency domain without remapping, and the precoding matrix includes an index of the second frequency domain after remapping with regard to a reference second type of frequency domain vector.

7. The method of claim 1, further comprising:
receiving, by the communication device, a signaling that includes at least one of a first channel status information (CSI) parameter for each of the N channel status information reference signal port groups, a second CSI parameter shared by the N channel status information reference signal port groups, wherein the first CSI parameter includes a codebook restriction, and the second CSI parameter includes a rank restriction.

8. The method of claim 1, wherein the report includes $\lceil \log_2 R_1 \rceil$ bits corresponding to one vector of the first type of vectors, wherein $R_1$ is a number of the first type of frequency units in one second type of frequency domain unit.

9. The method of claim 1, wherein a column with index l of a sub matrix with index j of one precoding matrix with index $t_1$ includes one of a plurality of formats, including:

$$w_{t_1,j}^l = \begin{bmatrix} w_{t_1,0.}^l & j \\ w_{t_1,1.}^l & j \end{bmatrix} =$$

$$\frac{1}{\beta_{l,j}} \begin{bmatrix} \sum_{i=0}^{L_j-1} v_{i,j} p_{l,0,j}^{(1)} \phi_j^{(4)} \sum_{f=0}^{M_j-1} y_{t_1,l,f,j}^{(1)} p_{l,i,f,j}^{(2)} \phi_{l,i,f,j}^{(2)} \\ \sum_{i=0}^{L_j-1} v_{i,j} p_{l,1,j}^{(1)} \phi_j^{(4)} \sum_{f=0}^{M_j-1} y_{t_1,l,f,j}^{(1)} p_{l,i+L,f,j}^{(2)} \phi_{l,i+L,f,j}^{(2)} \end{bmatrix},$$

wherein $$y_{t_1,l,f,j}^{(1)}$$

is an element of a first type of vector specific to layer l, first type of vector index $f$ and CSI-RS port group index j, $$y_{t_1,l,j}^{(1)}$$

is an element of a first type of vector specific to layer l, and CSI-RS port group index j.

10. The method of claim 9, wherein the precoding matrix indicator includes $$i_l^*, f_l^*, j_l^*$$

corresponding to a maximum value among amplitudes $$P_{l,i,f,j}^{(2)},$$

for each layer l.

11. The method of claim 9, wherein the precoding matrix indicator includes N−1 of $$\phi_j^{(4)}$$

without reporting $$\phi_0^{(4)} = 1.$$

12. The method of claim 9, wherein the precoding matrix indicator includes one of:
one bitmap for each CSI port group of each layer to indicate non-zero values of $$p_{l,i,f,j}^{(2)} \text{ and } \phi_{l,i,f,j}^{(2)}$$

of each CSI port group of the corresponding layer; or
one bitmap for each layer to indicate the non-zero values of $$p_{l,i,f,j}^{(2)} \text{ and } \phi_{l,i,f,j}^{(2)}$$

of the corresponding layer,
wherein a total number of value 1 in one bitmap is not larger than a first threshold;
a total number of value 1 in multiple bitmaps corresponding to multiple channel status information reference signal port group indices and one layer is not larger than a third threshold; or
a total number of value 1 in multiple bitmaps corresponding to multiple channel status information reference signal port group indices and multiple layers is not larger than a fourth threshold.

13. The method of claim 7, wherein the precoding matrix indicator includes $M_j-1$ of $$n^f_{3,l,j}$$

for one CSI-RS port group j, where $$n^f_{3,l,j}$$

is after a remapping operation, wherein the remapping operation refers to at least one of:

$$n^f_{3,l,j} = \left(n^f_{3,l,j} - n^{f^*}_{3,l,j}\right) \bmod F_3.$$

14. A method of communication, comprising:
transmitting, by a communication node, channel status information reference signals on N channel status information reference signal port groups, wherein N is a positive integer;
receiving, by the communication node, from a communication device, a report including a precoding matrix indicator that includes information about a first type of vector, wherein the first type of vector includes C elements, and each of the C elements corresponds to one first type of frequency domain unit, wherein C is a positive integer; and
determining, by the communication node, C precoding matrices based on the received report,
wherein each of the C precoding matrices corresponds to one first type of frequency domain unit and includes N sub-precoding matrices each of which corresponds to one of the N channel status information reference signal port groups,
wherein the report further includes one or more CSI-RS resource indicators (CRIs) corresponding to the precoding matrix indicator, the N sub-precoding matrices correspond to a same set of layers, each of the N channel status information reference signal port groups corresponds to one CSI-RS resource respectively.

15. The method of claim 14, wherein one element with index $t_1$ of the first type of vector includes $$y^{(1)}_{t_1,l,j}$$

expressed by $$y^{(1)}_{t_1,l,j} = e^{j\frac{2\pi n_{4,l,j} t_1}{F_4}},$$

$n_{4,l,j} \in \{0, 1, \ldots, F_4-1\}$, $t_1=0, 1, \ldots, F_4-1$ or $$y^{(1)}_{t_1} = \exp^{\frac{j2\pi n_4 t_1}{F_4}},$$

$n_4 \in \{0, 1, \ldots F_4-1\}$, $t_1=0, 1 \ldots, F_4$, wherein $F_4$ is a number of first type of frequency domain units.

16. The method of claim 15, wherein one element with index $t_2$ of a second type of vector includes $$\gamma^{(2)}_{t_2}$$

expressed by:

$$y^{(2)}_{t_2} = e^{j\frac{2\pi\left(n^f_3 * R_1\right) t_2}{F_3 * R_1}},$$

$$n^f_3$$

$\in \{0, 1, \ldots F_3-1\}$, $t_2=0, 1, \ldots F_3-1$, $f=0, 1, \ldots$
$M_j-1$ wherein $M_j$ is a number of the second type of vectors, $F_4$ is the number of the first type of frequency domain units and $F_4$ equals C, $F_3$ is the number of the second type of frequency domain units and $F_3$ equals D, wherein $F_4 \geq F_3$.

17. The method of claim 14, wherein the report includes $\lceil \log_2 R_1 \rceil$ bits corresponding to one vector of the first type of vectors, wherein $R_1$ is a number of the first type of frequency units in one second type of frequency domain unit.

18. The method of claim 14, wherein the precoding matrix indicator includes one of:
one bitmap for each CSI port group of each layer to indicate non-zero values of $$p^{(2)}_{l,i,f,j} \text{ and } \phi^{(2)}_{l,i,f,j}$$

of each CSI port group of the corresponding layer; or
one bitmap for each layer to indicate the non-zero values of $$p^{(2)}_{l,i,f,j} \text{ and } \phi^{(2)}_{l,i,f,j}$$

of the corresponding layer,
wherein a total number of value 1 in one bitmap is not larger than a first threshold;
a total number of value 1 in multiple bitmaps corresponding to multiple channel status information reference signal port group indices and one layer is not larger than a third threshold; or
a total number of value 1 in multiple bitmaps corresponding to multiple channel status information reference signal port group indices and multiple layers is not larger than a fourth threshold.

19. A communication device, comprising at least one processor configured to perform a method comprising:
determining N channel status information reference signal port groups, wherein N is a positive integer;
receiving channel status information reference signals on the N channel status information reference signal port groups;

determining C precoding matrices based on the received channel status information reference signals on the N channel status information reference signal port groups, wherein C is a positive integer; and transmitting a report including a precoding matrix indicator that includes information about a first type of vector, wherein the first type of vector includes C elements, and each of the C elements corresponds to one first type of frequency domain unit, wherein each of the C precoding matrices corresponds to one first type of frequency domain unit and includes N sub-precoding matrices each of which corresponds to one of the N channel status information reference signal port groups, wherein the report further includes one or more CSI-RS resource indicators (CRIs) corresponding to the precoding matrix indicator, the N sub-precoding matrices correspond to a same set of layers, each of the N channel status information reference signal port groups corresponds to one CSI-RS resource respectively.

20. The communication device of claim 19, wherein the precoding matrix indicator further includes information about a second type of vector, wherein the second type of vector includes D elements, and each of the D elements corresponds to a second type of frequency domain unit, wherein D is a positive integer.

\*    \*    \*    \*    \*